United States Patent
Kubota

(10) Patent No.: US 7,634,534 B2
(45) Date of Patent: Dec. 15, 2009

(54) DELAY STORAGE DEVICE AND DELAY TREATING METHOD

(75) Inventor: Kazumi Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 790 days.

(21) Appl. No.: 11/130,364

(22) Filed: May 17, 2005

(65) Prior Publication Data

US 2005/0228906 A1 Oct. 13, 2005

Related U.S. Application Data

(63) Continuation of application No. PCT/JP03/006004, filed on May 14, 2003.

(51) Int. Cl.
*G06F 15/16* (2006.01)

(52) U.S. Cl. ............... 709/203; 709/217; 709/226; 718/102

(58) Field of Classification Search ............ 709/202, 709/203, 217–219, 223–225, 232, 234, 235, 709/226; 718/102

See application file for complete search history.

(56) References Cited

U.S. PATENT DOCUMENTS

| | | | |
|---|---|---|---|
| 6,070,184 A | | 5/2000 | Blount et al. |
| 7,152,102 B2 * | | 12/2006 | Brinton et al. ............ 709/223 |
| 7,454,457 B1 * | | 11/2008 | Lowery et al. ............ 709/203 |
| 2002/0078214 A1 | | 6/2002 | Shindou et al. |

FOREIGN PATENT DOCUMENTS

| | | |
|---|---|---|
| JP | 6-19819 A | 1/1994 |
| JP | 7-129498 A | 5/1995 |
| JP | 9-50412 | 2/1997 |
| JP | 11-120108 | 4/1999 |
| JP | 2000-261556 | 9/2000 |
| JP | 2000-261556 A | 9/2000 |
| JP | 2000-268012 A | 9/2000 |
| JP | 2002-57691 | 2/2002 |
| JP | 2002-132742 A | 5/2002 |
| JP | 2002-189650 | 7/2002 |
| JP | 2002-259234 A | 9/2002 |
| JP | 2002-259338 | 9/2002 |

OTHER PUBLICATIONS

"Structuring a High-Performance and Availability Cluster System" p. 3, 1.1, Type of Load Balancing, [online], Zeus Technology, Technical Material, Technical Information. printed 2005 http://www.jp.zeus.com/library/technical/cluster/index.html (in Japanese).
Japanese Office Action mailed Oct. 21, 2008, issued in corresponding Japanese Application No. 2004-571845.
"Japanese Decision of Rejection", Complete English-language translation, mailed Aug. 25, 2009 from Jp Patent Office for corresponding JP App. No. 2004-571845.

* cited by examiner

*Primary Examiner*—David Lazaro
(74) *Attorney, Agent, or Firm*—Fujitsu Patent Center

(57) ABSTRACT

A delay storage device accepts a processing request sent from a user terminal, registers identifier and acceptance data and time of the processing request in an information management table, sends an answer message including the identifier, and relays the accepted processing request to a processor while adjusting transfer rate of the processing request depending on the performance of the processor.

6 Claims, 21 Drawing Sheets

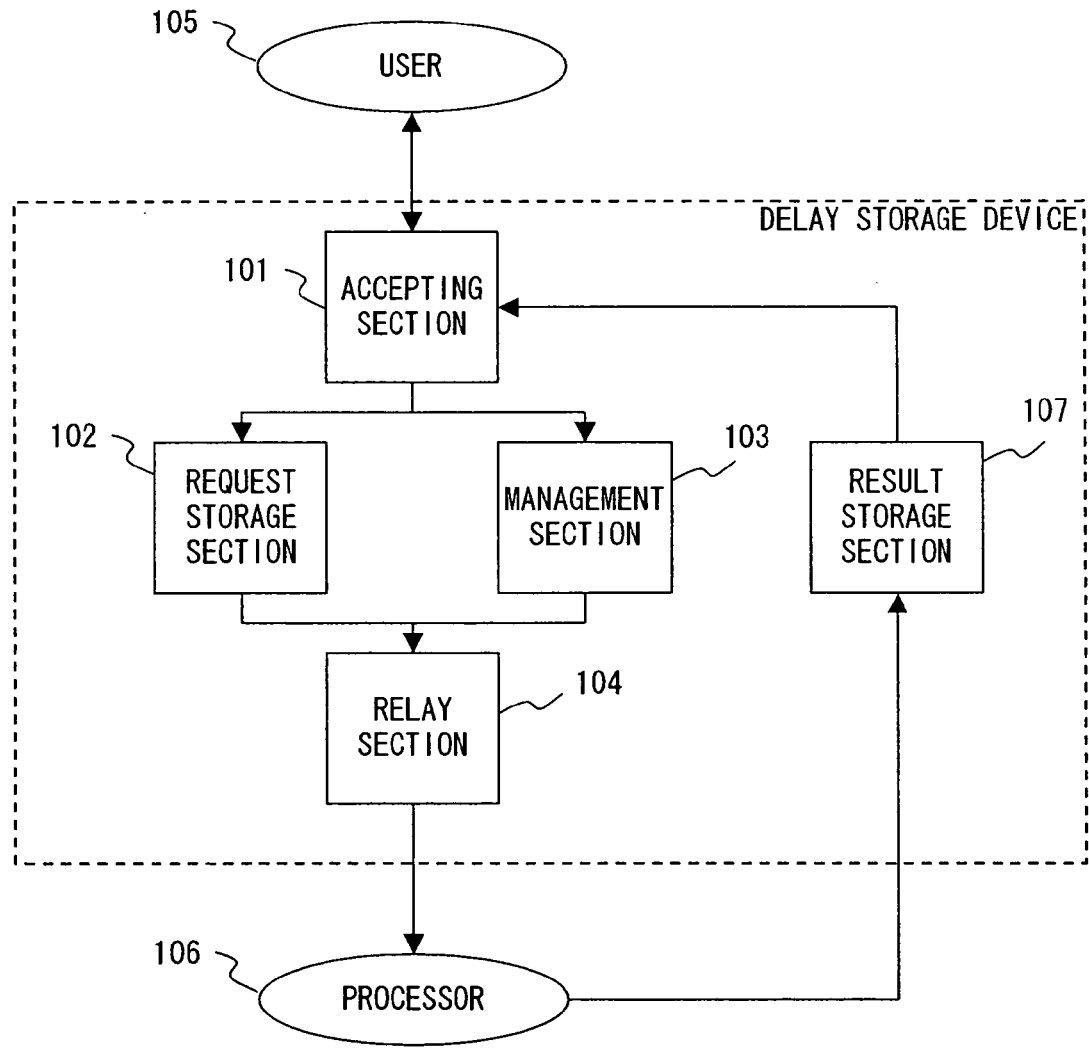
F I G. 1

| PROCESSING REQUEST IDENTIFIER | PROCESSING REQUEST NUMBER | ACCEPTANCE DATE AND TIME | RELAY STATUS | PROCESSING RESULT NUMBER |
|---|---|---|---|---|
| 5123 | 1 | 2003/1/20 11:28 | RESULT ACCEPTED | 1 |
| 5124 | 2 | 2003/1/20 11:28 | RESULT ACCEPTED | 2 |
| 5240 | 3 | 2003/1/20 11:28 | IN PROCESS | −1 |
| 5255 | 4 | 2003/1/20 11:28 | ACCEPTED | −1 |
| 5678 | 5 | 2003/1/20 12:40 | ACCEPTED | −1 |
| | | | | |
| | | | | |

FIG. 9

| PROCESSING REQUEST NUMBER | PROCESSING REQUEST |
|---|---|
| 1 | http://www.xxx.co.jp/cgi-bin/yoyaku.cgi?name=yyy&code=0016 |
| 2 | http://www.xxx.co.jp/cgi-bin/yoyaku.cgi?name=aaa&code=0031 |
| 3 | http://www.xxx.co.jp/cgi-bin/yoyaku.cgi?name=bbb&code=0001 |
| 4 | http://www.xxx.co.jp/cgi-bin/yoyaku.cgi?name=ccc&code=1234 |
| 5 | http://www.xxx.co.jp/cgi-bin/yoyaku.cgi?name=aaa&code=1234 |
| | |
| | |

FIG. 10

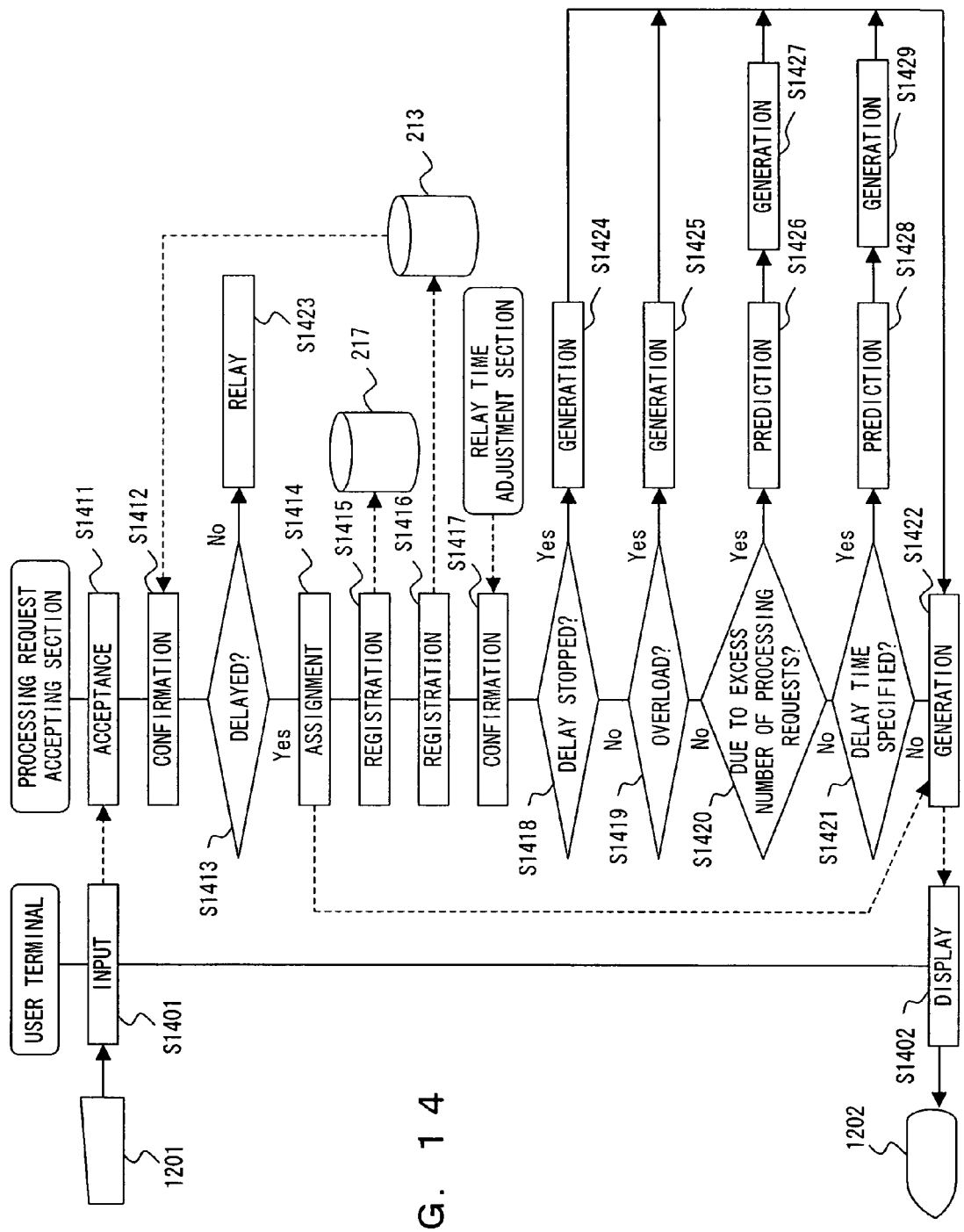
F I G. 1 4

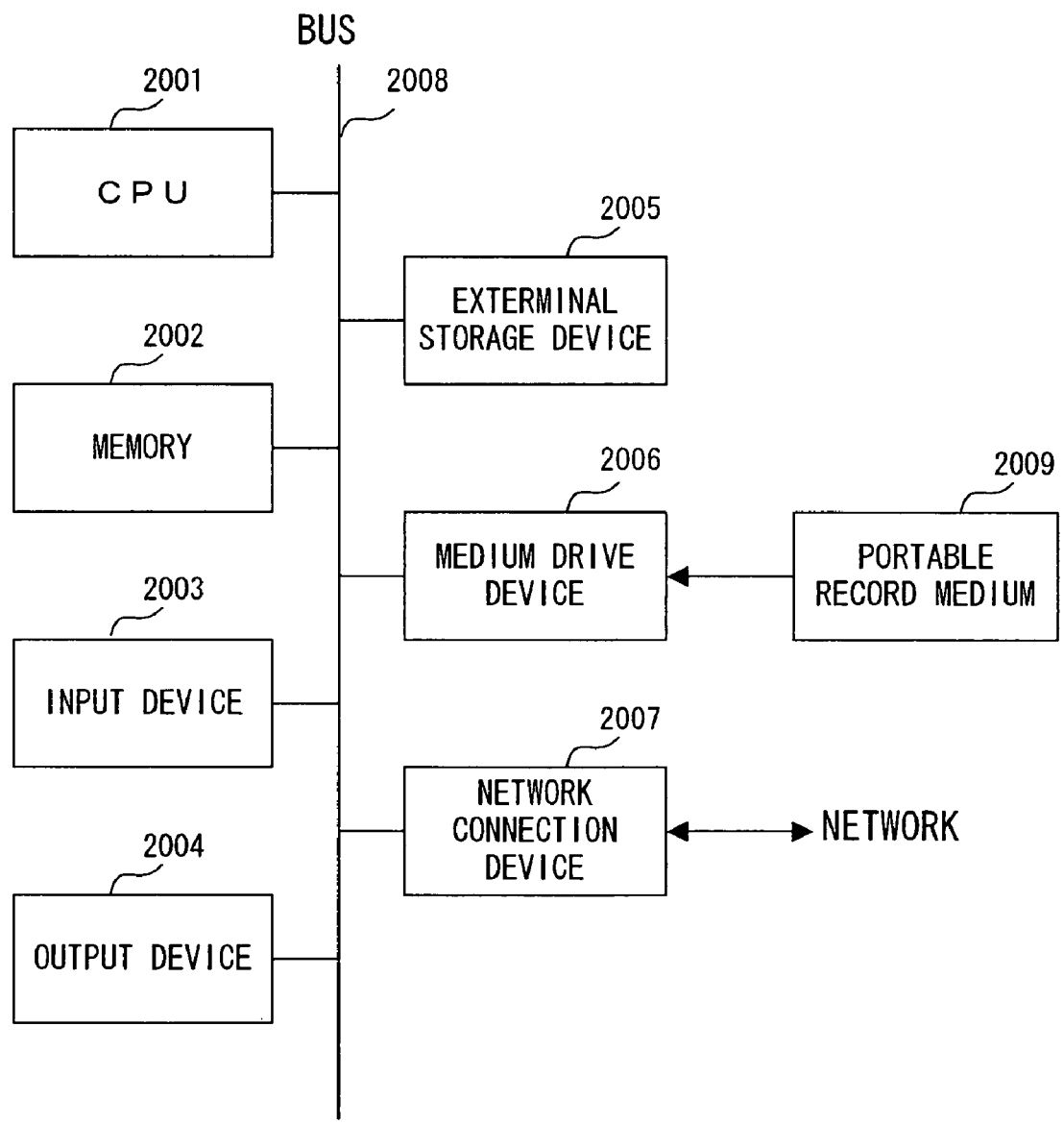
F I G. 20

DELAY STORAGE DEVICE AND DELAY TREATING METHOD

CROSS REFERENCE TO RELATED APPLICATION

This application is a continuation of PCT application of PCT/JP2003/006004, which was filed on May 14, 2003.

BACKGROUND OF THE INVENTION

1. Field of the Invention

The present invention relates to a delay storage device which is provided at a stage preceding a processor for sequentially performing a process at a request from a user, temporarily stores the processing request while sequentially inputting a large number of quickly received processing requests to a processor at a subsequent stage, and controls the transfer rate of processing requests depending on the request of a user and the performance of the processor at the subsequent stage, and also relates to a delay treating method.

2. Description of the Related Art

In the processor of the conventional Web server, etc., a round robin technology is used to provide a domain name server (DNS) for allocating processing requests to a plurality of processors to reduce the load of a system, and relay a processing request from a user (for example, non-patent document 1 and patent document 1). In this technology, a plurality of servers are virtually recognized by a client as one server, but actually a processing request is allocated to a plurality of servers.

There is another technology of providing a device called a proxy server between a user and a processor, recording a processing request from a user, and also recording a processing result from a processor (for example, patent document 2). In this technology, when the same processing request is issued from the same or another user again, a recorded processing result can be returned to a user as a processing result of the processor at a subsequent processor without relaying the processing request to the processor at the subsequent stage.

Non-patent Document 1

"Structuring a High-Performance and Availability Cluster System", on page 3, 1.1, Type of Load Balancing, [online], Jun. 16, 2000, Zeus Technology, Technical Material, Technical Information, [retrieved on Mar. 7, 2003], Internet<URL: http://www.jp.zeus.com/library/technical/cluster/index.html>

Patent Document 1

Japanese Published Patent Application No. 2002-057691

Patent Document 2

Japanese Published Patent Application No. 2002-259338

However, the above-mentioned conventional technology has the following problems.

With the conventional round robin technology, when all of a plurality of processors to be allocated enter in a high load status, a processing request from a user is kept waiting without an answer.

Also, with a proxy technology, since the processing result for the initially accepted processing request is not recorded, the processing request is transmitted to a subsequent processor as is. Therefore, when a subsequent processor is in a high load status, a processing request from a user is kept waiting without any answer even if a proxy server is allocated.

Actually, an upper limit of the performance (for example, the number of processes per unit time) of the processor at a subsequent processor is determined in many cases. Therefore, when the number of processing requests exceeds the upper limit, the processor overflows, and a delay occurs in processing time.

SUMMARY OF THE INVENTION

The present invention aims at providing a delay storage device and a delaying method for avoiding an overflow of a processor when a large number of quickly received processing requests are sequentially input to a processor at a subsequent processor.

Another advantage of the present invention is to avoid the status in which a user who has issued a processing request is kept waiting without an answer.

FIG. 1 shows the principle of the delay storage device. The delay storage device shown in FIG. 1 includes an accepting section 101, a request storage section 102, a management section 103, and a relay section 104, accepts a processing request from a user 105 to a processor 106, and relays it to the processor 106.

The accepting section 101 accepts a processing request, and the request storage section 102 temporarily stores the accepted processing request. The management section 103 stores the acceptance time of the accepted processing request, and the relay section 104 relays the processing request to the processor 106 in the order of acceptance time while adjusting the transfer rate of the processing request depending on the performance of the processor 106.

The relay section 104 adjusts the transfer rate of the processing request in, for example, the following methods.

(1) receiving the number of processing requests per specified unit time, and adjusting the transfer rate of processing requests such that the number of processing requests transmitted to the processor 106 per unit time cannot exceed the specified number of processing requests per unit time.

(2) receiving specified delay time, and relaying a processing request to the processor 106 after the passage of the specified delay time from the acceptance date and time of the accepted processing request.

(3) upon receipt of an instruction to stop a relay, stopping a relay of a processing request until a next instruction to resume a relay is received.

(4) detecting the load status of the processor 106, and adjusting the transfer rate of processing requests based on the detected load status.

As described above, by providing at a stage preceding the processor 106 a delay storage device for accepting a processing request and adjusting the transfer rate to the processor 106, the relay of a processing request can be delayed depending on the performance of the processor 106, thereby avoiding the overflow of the processor. Furthermore, by storing the acceptance time of a processing request upon receipt of the request together with a processing request, processing requests can be transferred to the processor 106 in the acceptance order.

The delay storage device further includes the result storage section 107 for storing a processing result returned from the processor 106 in response to the processing request relayed to the processor 106. The accepting section 101 issues an identifier for uniquely identifying the processing request, returns the identifier to the requester (the terminal, etc. of the user 105) of the processing request, and, when the requester requests a processing result in response to the processing request, reads a corresponding processing result from the result storage section 107 and transmits it to the requester.

Thus, by issuing an identifier when a processing request is accepted, and returning the identifier to the requester, a user can be notified of the acceptance of the processing request, thereby avoiding the state in which the user is kept waiting without an answer. Furthermore, by providing the result storage section 107, the requester can obtain a processing result of the transmitted processing request from the delay storage device using a returned identifier.

The accepting section 101, the request storage section 102, the management section 103, the relay section 104, and the result storage section 107 respectively correspond to, for example, a processing request accepting section 211, a processing request file 217, a information management table 213, a relay time adjustment section 214, and a processing result file 218.

BRIEF DESCRIPTION OF THE DRAWINGS

FIG. 1 shows the principle of the delay storage device according to the present invention;
FIG. 9 shows an information management table;
FIG. 10 shows a processing request file;
FIG. 14 is a flowchart of the processing request accepting process;
FIG. 20 shows the configuration of the information processing device.

DESCRIPTION OF THE PREFERRED EMBODIMENT

The embodiments of the present invention are described below in detail by referring to the attached drawings.

In the processor at a subsequent stage, the upper limit of the number of processes per unit time is determined by a total time of a time practically required for a process and a time required in accepting and answering a process. Therefore, by providing a device for relaying a processing request from a user at a preceding stage, and the device adjusting the number of processing requests per unit time such that the upper limit of the number of processes per unit time of the processor at the subsequent step cannot be exceeded, the overflow of the processor can be avoided.

The delay storage device of the present embodiment is used as a buffering device for temporarily storing a processing request from a user, and controls the transfer rate of a processing request depending on the performance of the processor. In the delay storage device, a storage function for temporarily storing a processing request and a function for recording the reception time of a processing request are provided. By recording the reception time of a processing request together with the processing request, the order of outputting the received processing request to the processor at a subsequent stage can be guaranteed, and a received processing request can be relayed at a specified time interval or frequency after a specified delay time.

Furthermore, when the delay storage device accepts a processing request from a requester, it can return an identifier for uniquely identifying a processing request and an answer in a predetermined format. Thus, a requester of a process can later ask the delay storage device using the identifier as to whether or not the processing request has been output to the processor at a subsequent stage, and can receive a processing result obtained by the processor.

For example, by providing a delay storage device at a stage preceding the processor such as a Web server, etc., the transfer rate of a received processing request can be controlled depending on the requirement of the performance of the Web server. For example, when the transfer rate of a processing request is 1000 transactions per second and the process speed of the Web server is 500 transactions per second, the transfer rate of processing requests can be delayed based on the process speed of the Web server.

Although trouble occurs in the disk device, etc. during the operation of the Web server, a processing request can be temporarily stored in the delay storage device without stopping the operation of the system, and the operation of the system can be continued by exchanging the disk device all the while.

Figure 2:
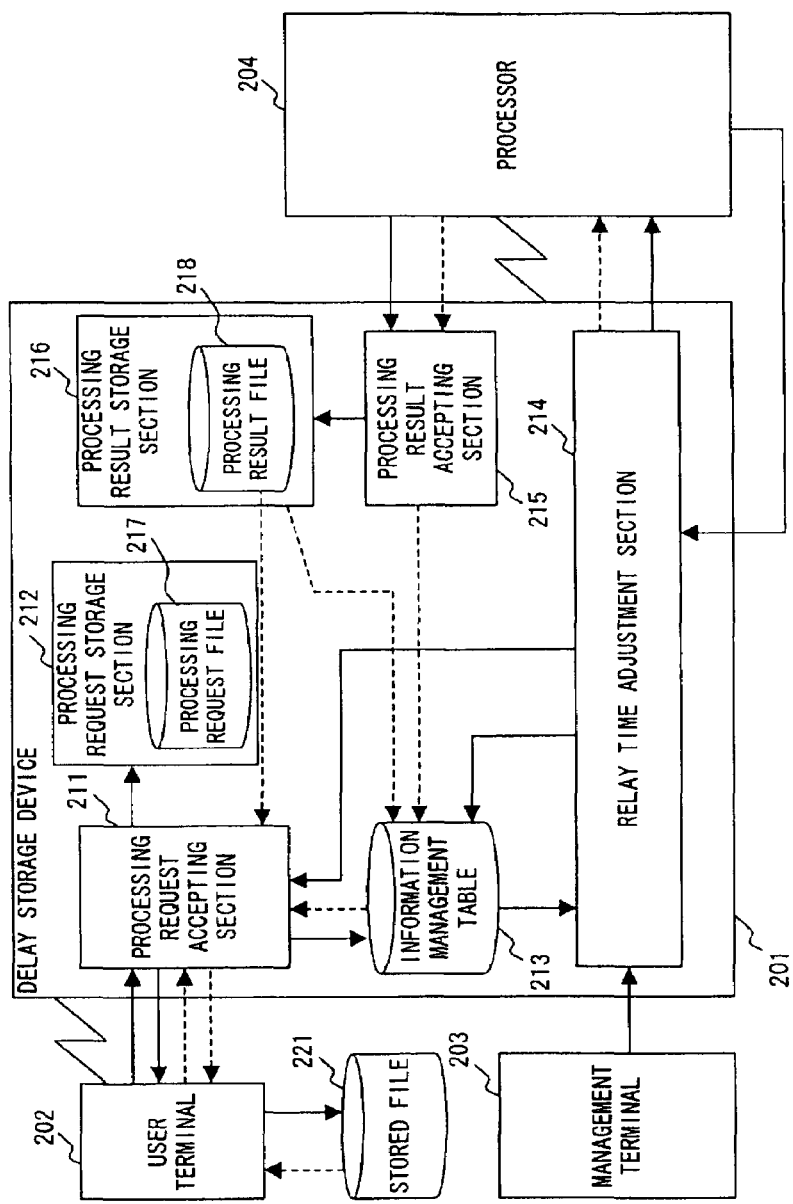
FIG. 2 shows the configuration of the delay storage system.

FIG. 2 shows the configuration of the delay storage system using the delay storage device. The delay storage system shown in FIG. 2 comprises a delay storage device 201, the user terminal 202, a management terminal 203, and a processor 204. The arrow by the solid lines shows the flow of the information when a processing request is issued, and the arrow by the broken lines shows the flow of the information when a processing result is requested.

The user terminal 202 is used in inputting a processing request from a user and displaying a processing result, and the management terminal 203 is used in specifying a delay time by a manager, instructing the stop/resumption of a relay, and specifying the number of processing requests per unit time. The processor 204 performs a process at a processing request received from the delay storage device 201, and returns a processing result.

The delay storage device 201 comprises the processing request accepting section 211, a processing request storage section 212, the information management table 213, the relay time adjustment section 214, a processing result accepting section 215 and a processing result storage section 216, and relays a processing request from the user terminal 202 to the processor 204.

The processing request accepting section 211 accepts a processing request from the user terminal 202, assigns an identifier for identification of the accepted processing request and an acceptance date and time to a processing request, and generates a message for the user. The processing request storage section 212 temporarily stores the accepted processing request to the processing request file 217. The information management table 213 stores an identifier of a processing request, an acceptance date and time of a processing request, a relay status of a processing request, and management information connecting a processing request to a processing result.

The relay time adjustment section 214 outputs a processing request after adjusting the time when relaying the stored processing request. The processing result accepting section 215 receives a processing result from the processor 204 and issues the accepted data and time. The processing result storage section 216 assigne the accepted data and time to the received processing result and temporarily stores it in the processing result file 218.

The relay time adjustment section 214 detects the load status of the processor 204, and adjusts relay timing depending on the detected load status, the delay time and the number of processing requests per unit time, both are specified by the management terminal 203. Furthermore, the relay time adjustment section 214 controls the stop and the resumption of a relay at an instruction of the management terminal 203. By providing the relay time adjustment section 214, the overflow of the processor 204 can be avoided.

The processing request accepting section 211 generates a message (delay message) that a delay occurs in the processing and gives it to a user as an answer for the processor 204 when there is a delay in the relay of a processing request. It also issues an identifier of the accepted processing request to the user terminal 202, and returns a processing result from the processor 204 when the user terminal 202 later requests a processing result again using the identifier.

The user terminal 202 stores in the local storage file 221 a cookie containing the identifier of a delay message and a processing request received from the delay storage device 201 to read it later when a processing result is requested. When there is a delay of the relay of a processing request, a user can be informed of the delay without being kept waiting by using the message and identifier, and can receive a processing result later.

Figure 3:
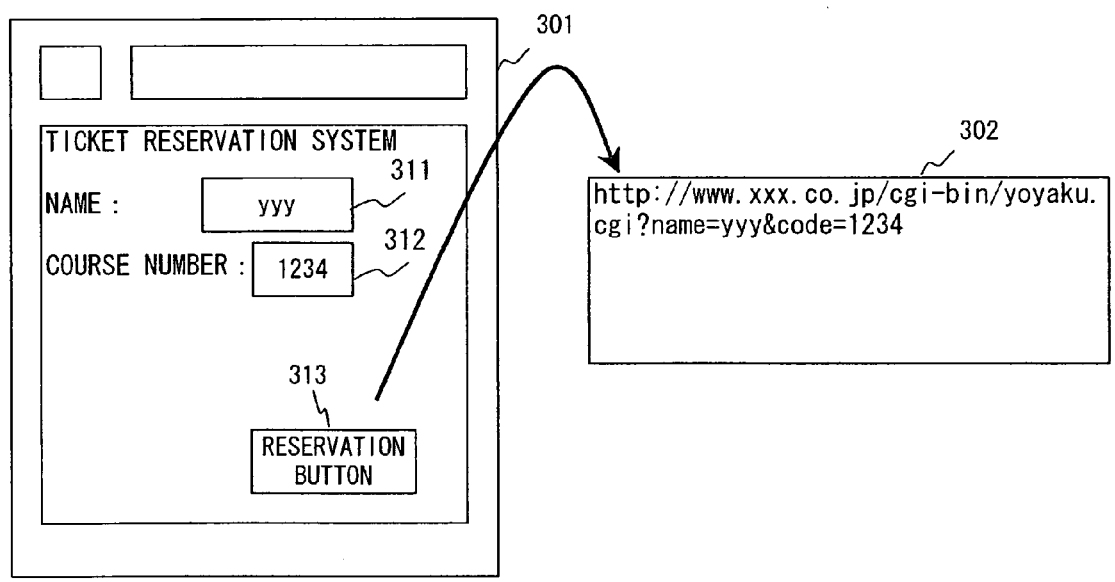
FIG. 3 shows a processing request.

FIG. 3 shows an example of a processing request from a user. In this example, a processing request in the reservation acceptance system of a ticket using a Web server as the processor 204 is shown. On the user terminal 202, the user inputs a name 311 and a course number 312 to a reservation form 301, and clicks a reservation button 313. Then, a Web browser converts input information to a processing request 302 which can be processed in the Web server.

Figure 4:
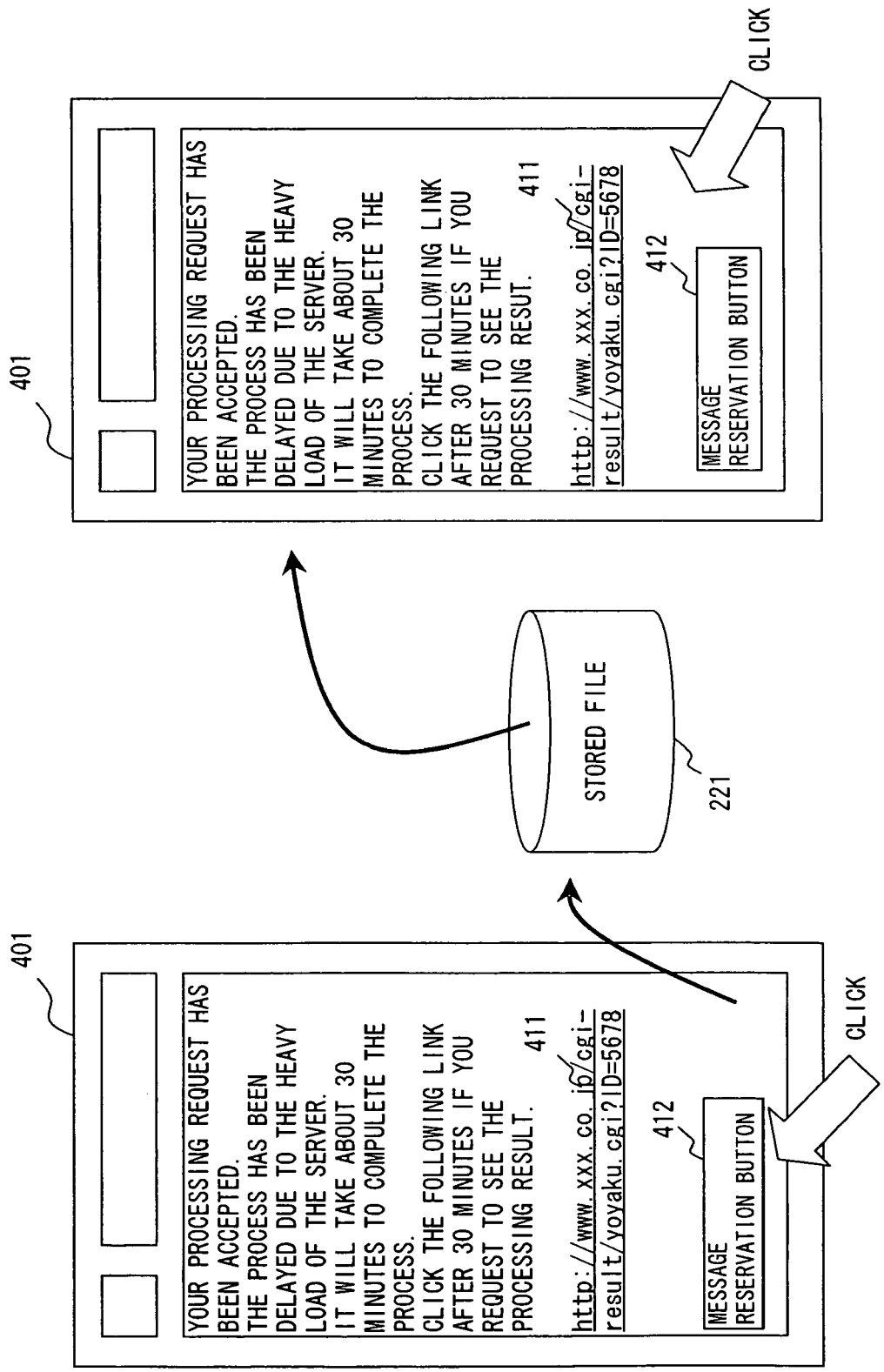
FIG. 4 shows the first delay message.
Figure 5:
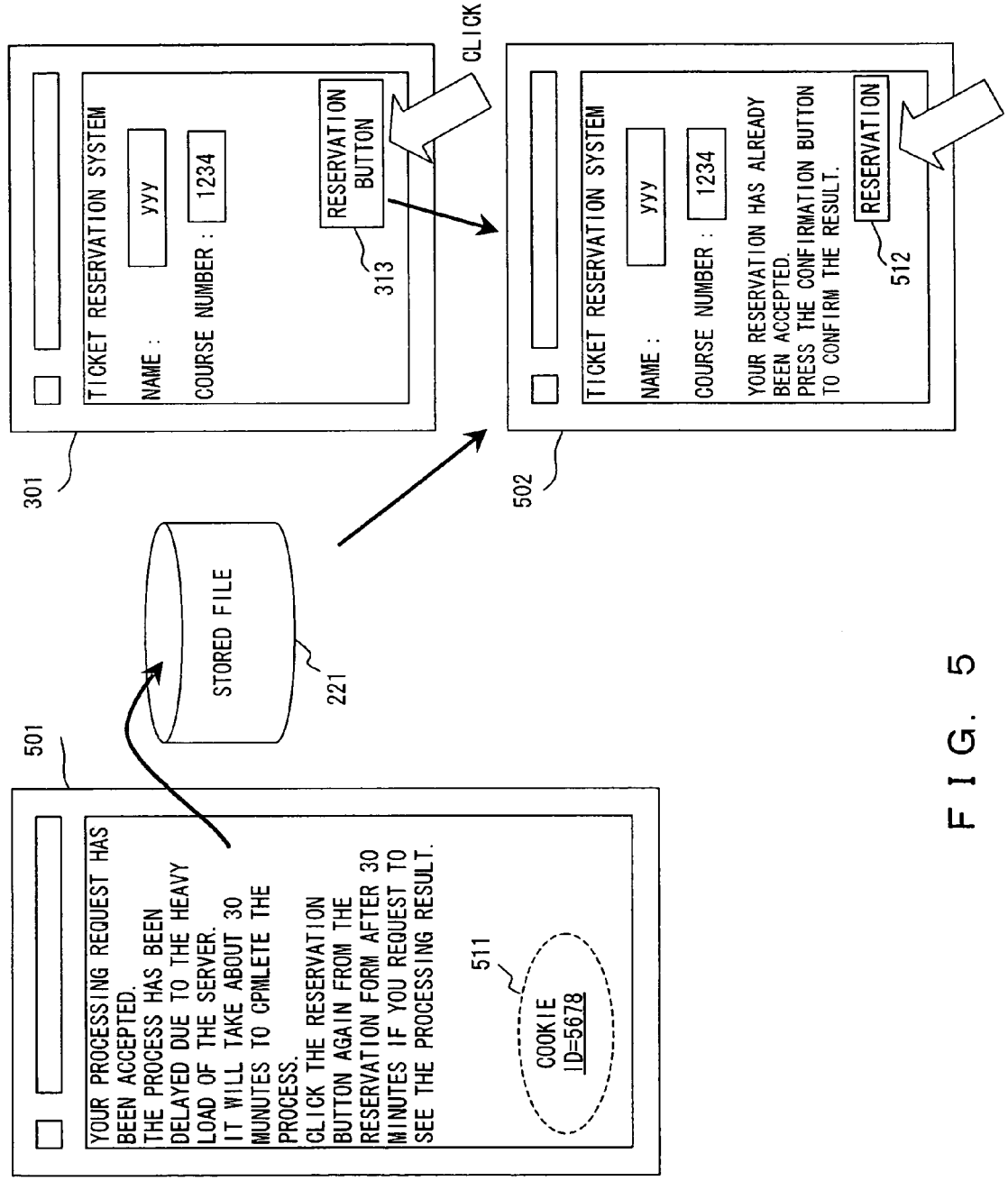
FIG. 5 shows the second delay message.
Figure 6:
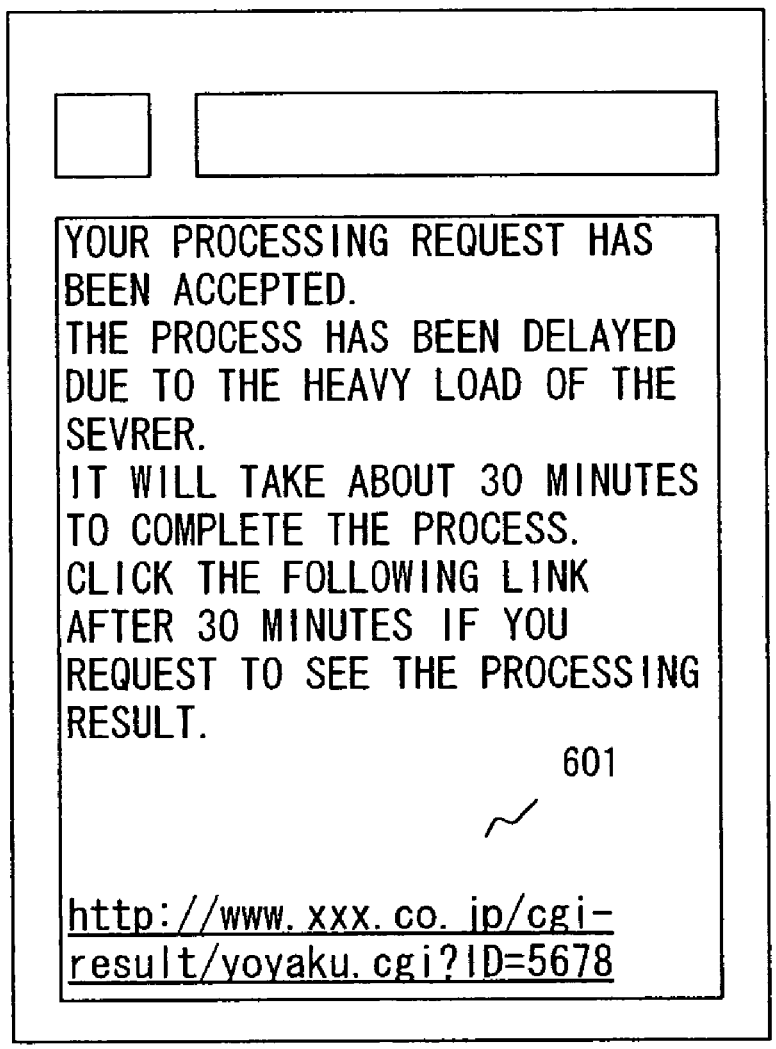
FIG. 6 shows the third delay message.

FIGS. 4 to 6 shows an example of a delay message returned to a user when a delay occurs in a relay of a processing request.

FIG. 4 shows an example of the case in which a delay message is stored. In this example, a delay message 401 is transmitted to the user terminal 202 as a document in an HTML (hypertext markup language) format. The delay message 401 contains the text indicating that the process is delayed due to a heavy server load, and it will take about 30 minutes to complete the process, and a link 411 for a request of a processing result which has been issued by the delay storage device 201. An identifier (ID=5678) of a processing request is assigned to the link 411.

When a user clicks a reservation button 412 of a message, the user terminal 202 stores the delay message 401 in the storage file 221. When a user requests a processing result after the passage of the delay time written in the delay message 401, the user terminal 202 reads the delay message 401 from the storage file 221, and displays it on the screen. At this time, the user clicks the link 411 to request the delay storage device 201 for the processing result.

FIG. 5 shows an example of a case in which a cookie is used. Normally, the Web browser of the user terminal 202 has the facility called a cookie for automatically storing the information about an identifier, etc. in the storage file 221 on the user terminal side based on an instruction of the server. Using the facility, a delay message 501 transmitted from the delay storage device 201 to the user terminal 202 can include an identifier of a processing request as a cookie 511.

The user terminal 202 automatically stores the accepted cookie 511 in the storage file 221. Then, when the user requests for a processing result after the passage of the delay time written in the delay message 501, the user calls again, for example, the screen of the reservation form 301, and clicks the reservation button 313. Thus, a processing request is transmitted to the delay storage device 201. At this time, the cookie 511 stored in the storage file 221 is automatically read, and transmitted to the delay storage device 201 together with the processing request.

The delay storage device 201 reads the cookie 511, thereby judging the presence/absence of the assigned identifier of a processing request, and determining the request as the already accepted one if there is the cookie 511 on the user terminal side. Based on the identifier, a reservation confirmation form 502 is transmitted to the user terminal 202. The user clicks a confirmation button 512 contained on the screen of the reservation confirmation form 502, thereby requesting the delay storage device 201 for a processing result.

The methods shown in FIGS. 4 and 5 are effective when a delay time is long and it is difficult to keep displaying a delay message on the user terminal 202. On the other hand, when the delay time is short and it is easy to keep displaying a delay message, a processing result can be requested by clicking the link embedded on the screen of the displayed delay message.

Figure 7:
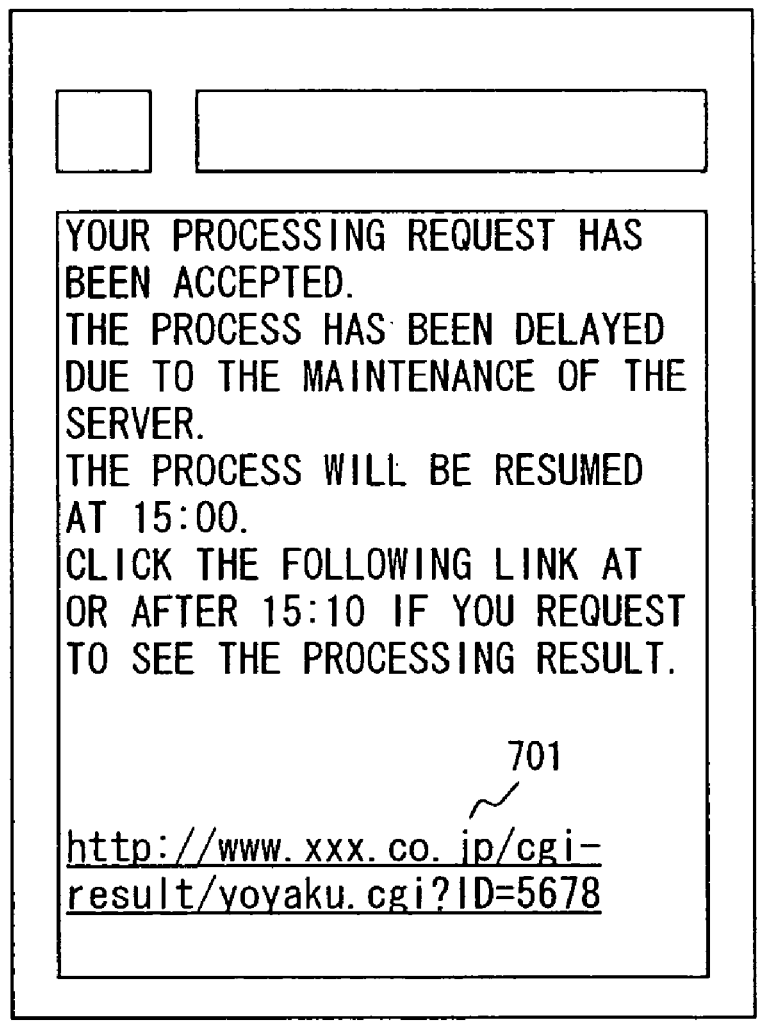
FIG. 7 shows the fourth delay message.

FIGS. 6 and 7 show the examples of delay message. The delay message shown in FIG. 6 is transmitted to the user terminal 202 when the process is delayed because the number of processing requests per unit time of the Web server exceeds a threshold. A link 601 for request of a processing result including an identifier of a processing request is inserted to the delay message, and the user can request the delay storage device 201 for a processing result by clicking the link 601.

The delay message shown in FIG. 7 is transmitted to the user terminal 202 when the process is delayed due to the maintenance of the Web server. In this case, the user can request the delay storage device 201 for a processing result by clicking a link 701 similar to the delay message shown in FIG. 6.

Figure 8:
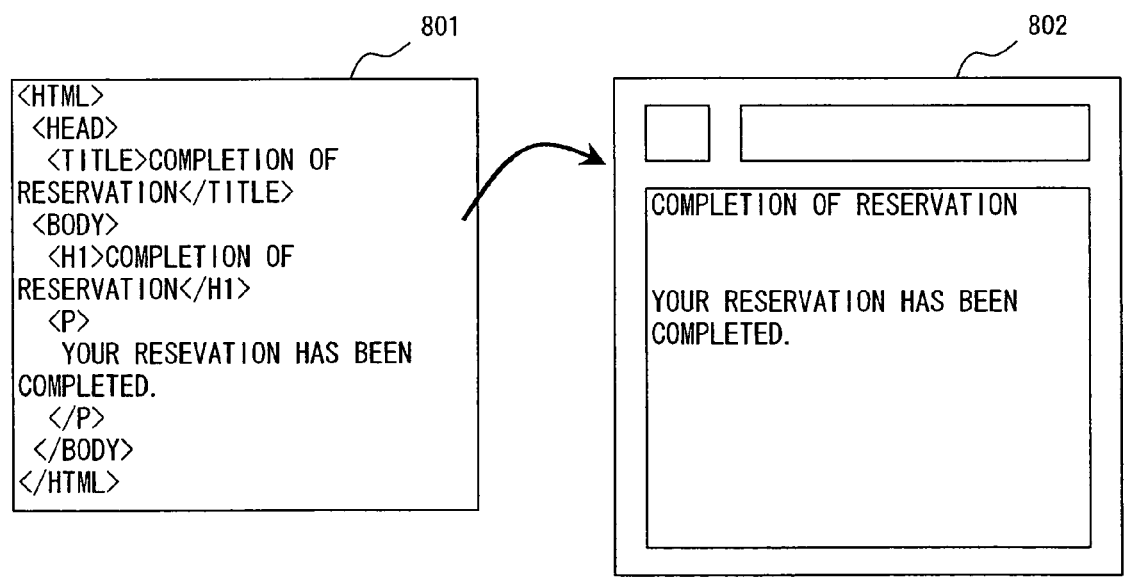
FIG. 8 shows a processing result.

FIG. 8 shows an example of a processing result returned from the processor 204. In this example, the processing request relayed by the delay storage device 201 is processed by the Web server, and a processing result 801 obtained as a result that a reservation has been completed is returned. The processing result 801 is temporarily stored in the processing result file 218 of the delay storage device 201, transmitted to the user terminal 202 depending on the request for the processing result from a user, and displayed by the Web browser as a result display 802.

FIG. 9 shows an example of the data of the information management table 213. A processing request identifier, a processing request number, an acceptance date and time, a relay status, and a processing result number are registered in the information management table shown in FIG. 9. Among them, the processing request number is used for coupling the data on the information management table 213 with the data in the processing request file 217, and the processing result number is used for coupling the data on the information management table 213 with the data in the processing result file 218.

As a relay status, one of "accepted", "in process", "result accepted", and "result deleted" (not shown in the attached drawings) is registered. "Accepted" indicates that a processing request has been registered. "In process" indicates that the processor 204 is performing a process. "Result accepted" indicates that a processing request from the processor 204 has been registered. "Result deleted" indicates that a registered processing result has been deleted. In the cases of "Accepted", "in process", and "result accepted", no processing result file is registered. Therefore, the processing result number is set to "−1".

FIG. 10 shows an example of the data of the processing request file 217. In the processing request file shown in FIG. 10, a processing request number and a processing request are registered for each processing request.

Figure 11:
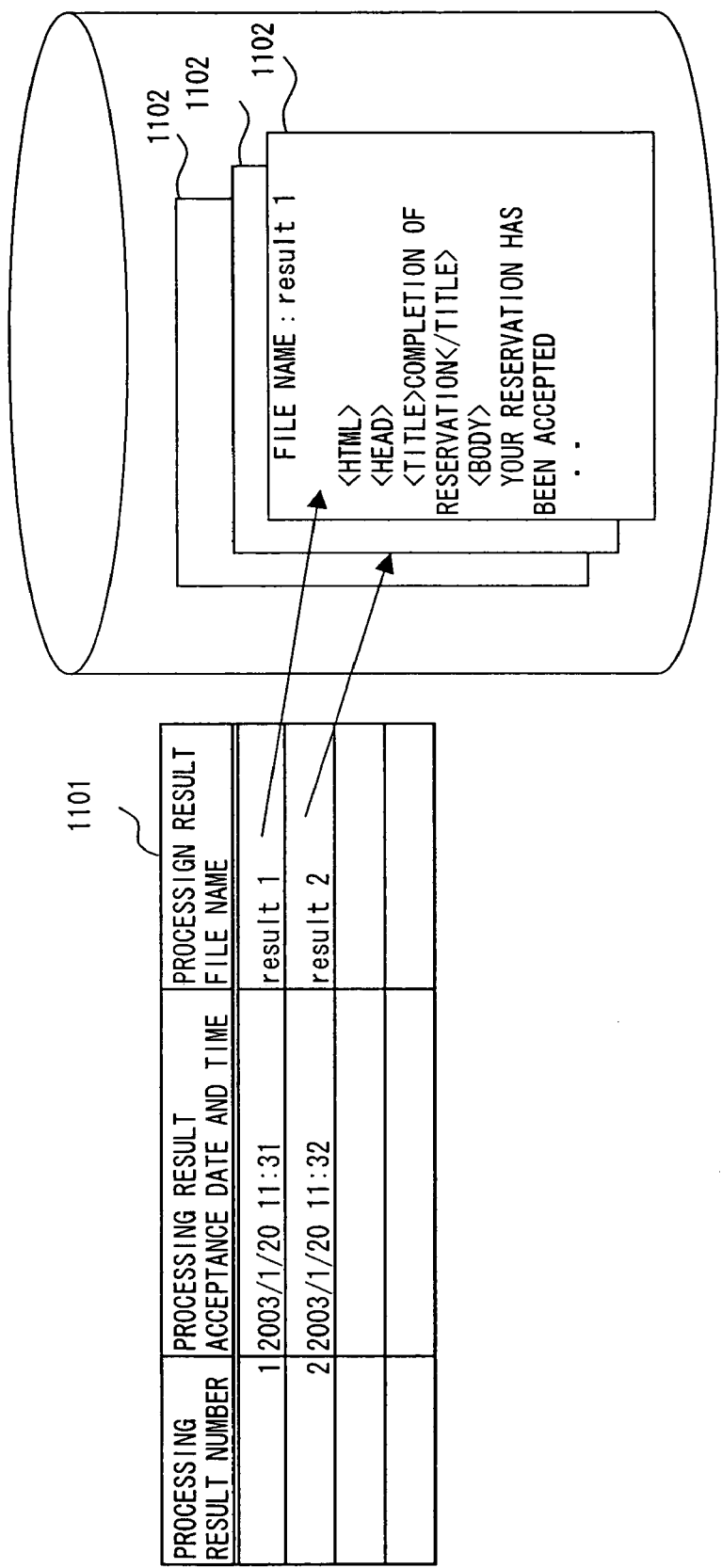
FIG. 11 shows a processing result file.

FIG. 11 shows an example of the data of the processing result file 218. The processing request file shown in FIG. 11 comprises a processing result table 1101 and a file 1102 storing each processing result. In the processing result table 1101, a processing result number, a processing result acceptance date and time, and a processing result file name are registered for each processing result. A processing result file name is the name of a file 1102, and the delay storage device 201 can read the file 1102 by referring to the processing result table 1101.

The process performed by the delay storage system shown in FIG. 2 is described in detail by referring to FIGS. 12 through 15.

Figure 12:
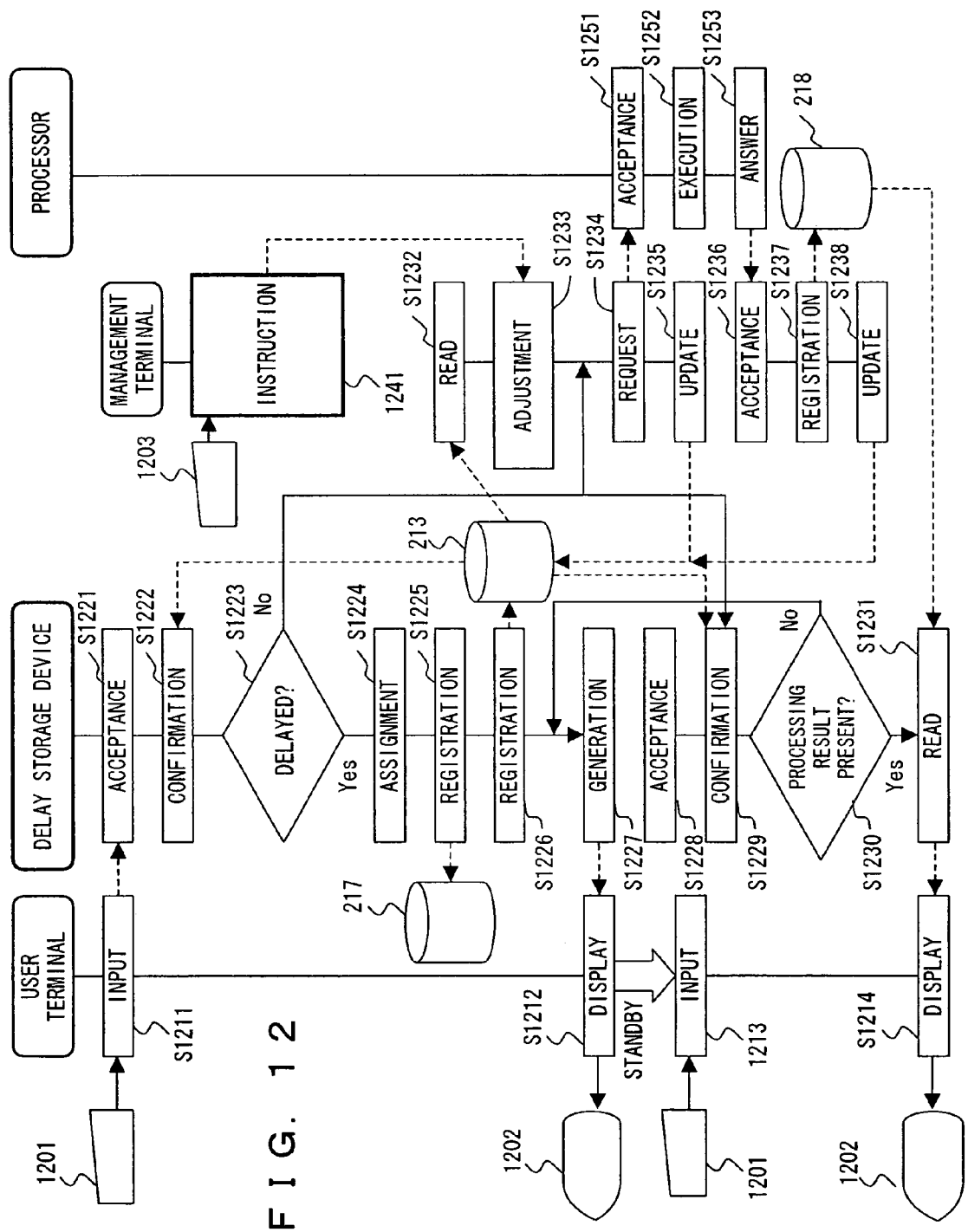
FIG. 12 is a flowchart of the process of the delay storage system.

FIG. 12 is a flowchart of the entire process of the delay storage system shown in FIG. 2. When a user inputs a processing request from an input device 1201 of the user terminal 202, and transmits it to the delay storage device 201 (step S1211), the processing request accepting section 211 accepts the processing request (step S1221).

Then, the processing request accepting section 211 refers to the information management table 213 to confirm the current processing request delay status (step S1222), and determines whether or not there is a delay of the relay of a processing request (step S1223).

If there is a delay of the relay of a processing request, an identifier for identification of the accepted processing request is issued, and the date and time on which the request was received are obtained (step S1224). Then, the processing request is registered in the processing request file 217 of the processing request storage section 212 (step S1225), and the identifier is registered in the information management table 213 together with the acceptance date and time (step S1226). In the case of the information management table shown in FIG. 9, the relay status is set as "accepted", and the processing result number is set to "−1."

Then, using a predetermined embodiment, an answer message including an identifier of a processing request is generated, and transmitted to the user terminal 202 (step S1227). As a result, the user terminal 202 displays the received answer message on the screen of a display 1202 (step S1212), thereby entering a standby state.

The system administrator inputs the designation of a predetermined delay time, an instruction to stop/resume a relay, and the number of processing requests per unit time (step S1241).

The relay time adjustment section 214 reads the data of the processing request from the information management table 213 (step S1232), and detects the load status of the processor 204, adjusts the relay time according to the delay time specified by the administrator and the number of processing requests per unit time, an instruction to stop/resume the relay from the administrator, and the information about the detected load status, etc. and determines the relay time (step S1233).

The processing request indicating "accepted" as the relay status is read from the processing request file 217 in the order of acceptance date and time, sequentially relayed and transmitted to the processor 204 (step S1234), and the relay status of the relayed processing request is changed to "in process" (step S1235).

The processor 204 accepts a processing request from the delay storage device 201 (step S1251), performs a requested process (step S1252), and answers a processing result (step S1253).

The processing result accepting section 215 accepts a processing result from the processor 204 (step S1236), and registers it in the processing result file 218 of the processing result storage section 216 (step S1237). At this time, the acceptance date and time of the processing result is registered in the processing result table of the processing result file 218.

The processing result accepting section 215 registers the information about a processing result file in the information management table 213 (step S1238). In this example, the relay status of the information management table 213 is changed into "result accepted", and the processing result number is changed from "−1" to the actual processing result number.

A user who has received from the delay storage device 201 an answer message that there is a delay of the relay of a processing request later requests the delay storage device 201 for a processing result. At this time, the user inputs a processing result request from the input device 1201, and transmits it to the delay storage device 201 (step S1213). Thus, the identifier of the processing request contained in the answer message is transmitted to the delay storage device 201.

The processing request accepting section 211 accepts the processing result request (step S1228), refers to the information management table 213, confirms the relay status of the processing request corresponding to the received identifier (step S1229), and determines whether or not a processing result is stored in the processing result file 218 (step S1230).

At this time, if a processing request has already been relayed to the processor 204, and the result is stored in the processing result file 218 (the relay status is "result accepted"), then the processing result is read and transmitted to the user terminal 202 (step S1231). As a result, the user terminal 202 displays the received processing result on the screen of the display 1202 (step S1214).

If a processing request has not been relayed (the relay status is "accepted"), or a processing request has been relayed but a processing result has not been accepted (the relay status is "in process"), then the processing request accepting section 211 generates a corresponding answer message, and transmits it to the user terminal 202 (step S1227).

If a processing result is returned from the processor 204, and there is not request for a processing result from the user after a predetermined time, then the processing result storage section 216 can delete the processing result depending on the storage capacity. In this case, the processing result storage section 216 registers the deletion information in the information management table 213. In this case, the relay status of the information management table 213 is changed to "result deleted".

If there is no problem when the same processing request is repeated twice, then when the user issues a processing result request for a deleted processing result, the processing request can be relayed to the processor 204. In this case, the delay storage device 201 refers to the information management table 213, reads the processing request from the processing request file 217, and relays and transmits it to the processor 204 again, thereby successfully receiving again a processing result.

The administrator sets the condition about the re-execution of a processing request to the processor 204, and the delay storage device 201 determines on the condition whether or not there is a problem with the re-execution of an accepted processing request, and relays a processing request satisfying the condition to the processor 204. Then, the processing result accepting section 215 stores the processing result in the processing result file 218, and the processing request accepting section 211 transmits the processing result to the user terminal 202.

If there is no delay of the relay of a processing request in step S1223, the relay time adjustment section 214 performs the processes in and after step S1234, and the processing request accepting section 211 performs the processes in and after 1229. In this case, the processing result accepted by the processing result accepting section 215 is transmitted as is to the user terminal 202.

Figure 13:
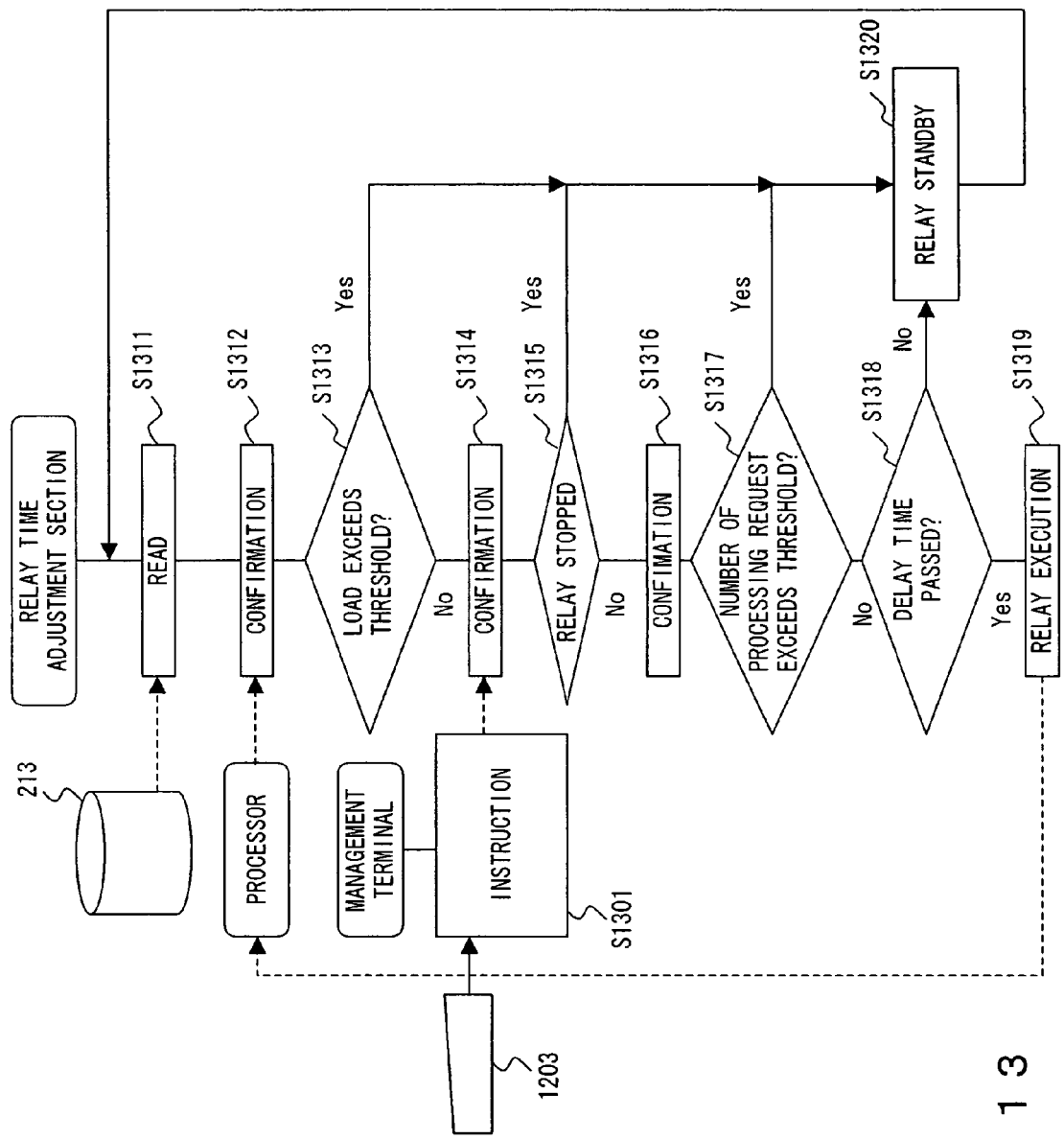
FIG. 13 is a flowchart of the relay time adjusting process.

FIG. 13 is a flowchart of the relay time adjusting process by the relay time adjustment section 214. The process in step S1301 shown in FIG. 13 is the same as the process in step S1241 shown in FIG. 12, and the processes in steps S1311 through S1320 correspond to the processes in steps S1232 through 1234 in FIG. 12.

The relay time adjustment section 214 reads the data of the processing request from the information management table 213 (step S1311), and confirms the load status of the processor 204 (step S1312). Then, based on the information read from the information management table 213, the processing request is relayed to the processor 204. At this time, the following four relay conditions are considered (steps S1313 through S1318)

(1) Number of Processing Requests Per Unit Time

A processing request is relayed depending on the performance of the processor at a subsequent stage such that a predetermined number of processes in a predetermined time cannot be exceeded.

(2) Specified Delay Time

A processing request is relayed after a specified delay time passes from the acceptance date and time of a processing request received from a user.

(3) Load Status of the Processor 204

When a load exceeding a predetermined threshold is applied to the processor 204, a relay is delayed.

(4) Instruction to Stop/Resume a Relay

Based on an instruction from an administrator, a relay of a processing request is stopped or resumed without explicitly specifying a delay time. While the relay is being stopped, the relay of a processing request is delayed.

First, it is determined whether or not the load of the processor 204 exceeds a threshold (step S1313). If the load exceeds the threshold, then the processes in and after step S1311 are repeated after a relay standby state (step S1320).

If the load does not exceed the threshold, then the instruction status from the management terminal 203 is checked (step S1314), and it is determined whether or not an instruction to stop a relay has been issued (step S1315) If an instruction to stop a relay has been issued, the processes in and after step S1311 are repeated after a relay standby state (step S1320).

If an instruction to stop a relay has not been issued, then the current number of processing requests in a unit time is checked (step S1316), and it is determined whether or not the number of processing requests in the unit time has exceeded the threshold (step S1317). As a threshold, the number of processing requests per unit time specified by the administrator is used. If the number of processing requests per unit time has exceeded the threshold, the processes in and after step S1311 are repeated after a relay standby (step S1320).

If the number of processing requests per unit time has not exceeded the threshold, then it is determined whether or not a specified delay time has passed from the processing request acceptance date and time (step S1318). If the delay time has not passed, the processes in and after step S1311 are repeated after the relay standby (step S1320). If the delay time has passed the relay of a processing request is performed (step S1319).

FIG. 14 is a flowchart of the processing request accepting process by the processing request accepting section 211. The processes in steps S1401 and S1402 shown in FIG. 14 are the same as the processes in steps S1211 and S1213 shown in FIG. 12, and the processes in steps S1411 through S1416 shown in FIG. 14 are the same as the processes in steps S1221 through S1226 shown in FIG. 12.

The process in step S1423 shown in FIG. 14 corresponds to the process in step S1234 shown in FIG. 12, and the processes in steps S1417 through S1422 shown in FIG. 14 and the processes in steps S1424 through S1429 correspond to the process in step S1227 shown in FIG. 12.

When the relay of the processing request by the relay time adjustment section 214 is delayed, the processing request accepting section 211 returns the message that the relay of the processing request is delayed to the user. The contents of the message are predetermined, and a message can include the identifier of a processing request.

Based on the above-mentioned four relay conditions, from the number of processing requests whose relay is delayed at the time and the performance of the processor 204, a message can include a predicted wait time until the accepted processing request is relayed. However, if an instruction to stop a relay has been issued, etc., a wait time cannot be predicted unless the relay resumption time is specified.

When an answer message is generated based on the four relay conditions, the processing request accepting section 211 first receives the reason for the delay of a relay from the relay time adjustment section 214 (step S1417). Then, it is determined whether or not the reason for the delay of a relay is the issue of an instruction to stop a relay (step S1418). If the reason for the delay of a relay is an issue of an instruction to stop a relay, then a delay message about the stop of a relay is generated (step S1424). Using it, an answer message including an identifier of a processing request is generated and transmitted to the user terminal 202 (step S1422).

If the reason for the delay of a relay is not an issue of an instruction to stop a relay, then it is determined whether or not the reason for the delay of a relay is the load of the processor 204 exceeding the threshold (step S1419). If the reason for the delay of a relay is the load of the processor 204 exceeding the threshold, then a delay message about the excess load of the processor 204 (step S1425) is generated, and the process in step S1422 is performed.

If the reason for the delay of a relay is not the load of the processor 204 exceeding the threshold, then it is determined whether or not the reason for the delay of a relay is the number of processing requests per unit time exceeding the threshold (step S1420). If the reason for the delay of a relay is the number of processing requests per unit time exceeding the threshold, then a relay execution time is predicted from the number of processing requests on standby for being relayed and the performance of the processor 204 (step S1426), and a delay message of exceeding the limit number of processing requests including the predicted relay time is generated (step S1427), and the process in step S1422 is performed.

If the reason for the delay of a relay is not the number of processing requests per unit time exceeding the threshold, then it is determined whether or not the reason for the delay of a relay is the designation of a delay time (s1421). If the reason for the delay of a relay is the designation of a delay time, then a relay execution time is predicted from the processing request acceptance date and time and the specified delay time (step S1428), and a delay message relative to the designation of a delay time including the predicted relay time (step S1429) is generated, and the process in step S1422 is performed.

If the reason for the delay of a relay is not the designation of a delay time, then an appropriate delay message including the identifier of a processing request is generated, and is transmitted to the user terminal 202 (step S1422).

Figure 15:
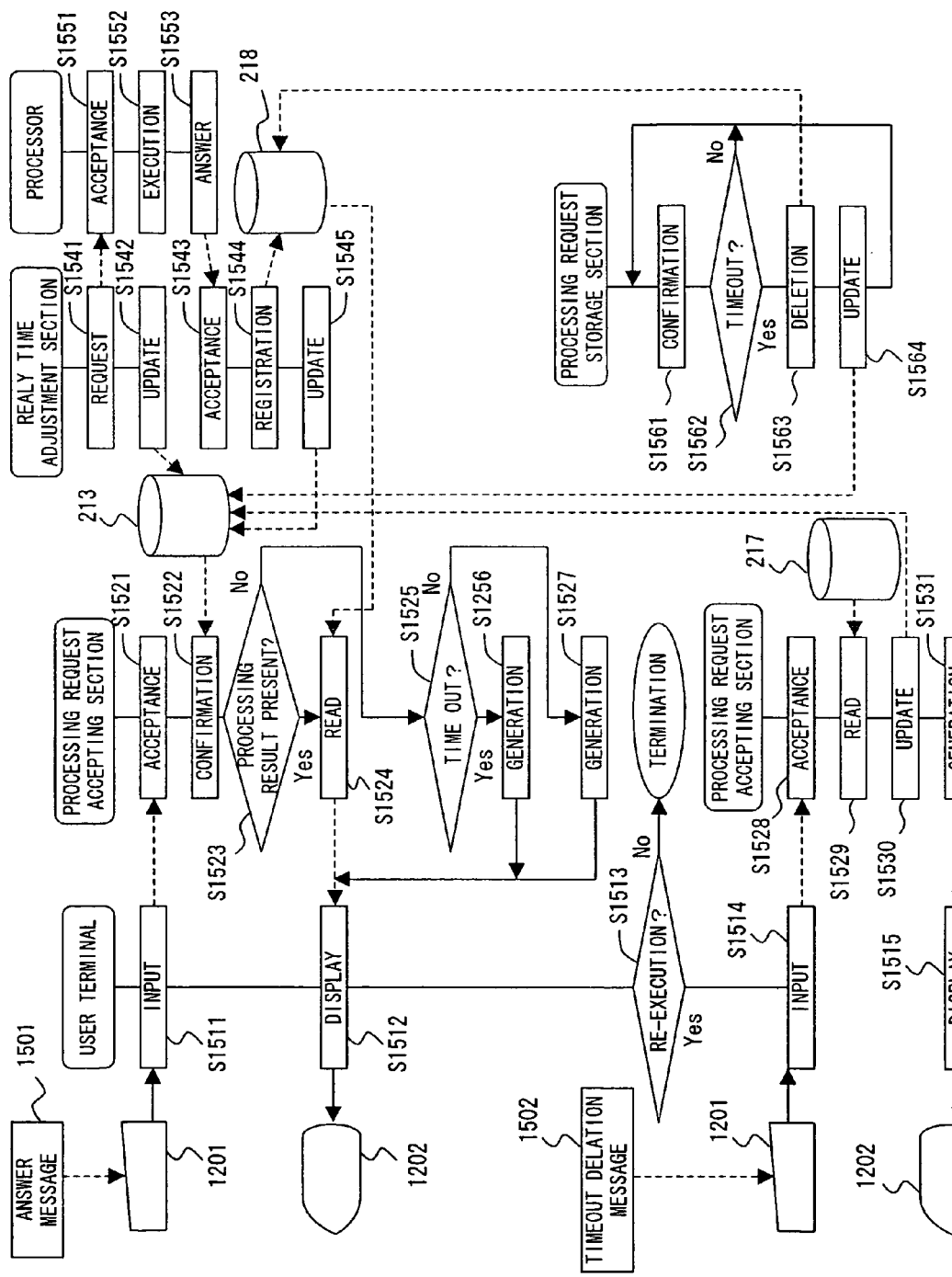
FIG. 15 is a flowchart of the processing result request accepting process.

FIG. 15 is a flowchart of the processing result request accepting process by the processing request accepting section 211 and the process relating to the processing result request accepting process. The processes in steps S1511 and S1512 shown in FIG. 15 are the same as the processes in steps S1213 and S1214 shown in FIG. 12, and the processes in step S1521 through S1524 shown in FIG. 15 are the same as the processes in steps S1228 through S1231 shown in FIG. 12.

The processes in steps S1541 through S1545 shown in FIG. 15 are the same as the processes in step S1234 through S1238 shown in FIG. 12, and the processes in steps S1551 through S1553 shown in FIG. 15 are the same as the processes in steps S1251 through S1253 shown in FIG. 12.

The processing result storage section 216 refers to the information management table 213, obtains the processing result number of the "result accepted" processing request, and refers to the processing result file 218 (step S1561) using the number as a key, thereby determining whether or not there is a timeout processing result for which a predetermined time has passed from the acceptance date and time of a processing result (step S1562). If there is not a processing result of a timeout, the processes in and after the step S1561 are repeated.

If there is a timeout processing result, it is deleted from the processing result file 218 (step S1563), and the relay status of the corresponding processing request in the information management table 213 is changed to "result deleted" (step S1564). Then, the processes in and after step S1561 are repeated.

When there is a delay of the relay of a processing request, the user receives an answer message 1501 through the processing request accepting section 211. When the answer message 1501 contains the identifier of a processing request, the user later transmits the processing result request including the identifier, thereby receiving the processing result of the issued processing request.

If a processing result is not stored (the relay status is not "result accepted") in step S1523, the processing request accepting section 211 determines whether or not a processing result has been deleted due to timeout (the relay status is "result deleted") (step S1525).

If the processing result has been deleted, the corresponding timeout deletion message is generated and transmitted as an answer message to the user terminal 202 (step S1526). If a processing result has not been deleted, a relaying process delay message is generated and is transmitted as an answer message to the user terminal 202 (step S1527).

If a processing result has been deleted due to a timeout, a process is automatically performed again in the above-mentioned method, and it is also possible for a user to select whether or not the process is performed again. In this case, the timeout deletion message contains the identifier of a processing request and a message for confirmation as to whether or not the process is performed again.

The user who received the above-mentioned timeout deletion message 1502 selects whether or not the process is to be performed again (step S1513). If the user does not select performing the process again, the user terminal 202 terminates the process.

If the user selects the request performing again the process, the user terminal 202 transmits a request to transmit again including the identifier of a processing request contained in a timeout deletion message 1502 to the delay storage device 201 (step S1514)

The processing request accepting section 211 accepts the request to perform again a process (s1528), refers to the information management table 213, and reads a processing request corresponding to the identifier of a processing request contained in the request to perform the process again (step S1529). Then, it is confirmed that the processing request contained in the request to perform the process again is the same as the read process request.

Then, the relay status of the information management table 213 is changed from "result deleted" to "accepted" (step S1530). Thus, since the relay time adjustment section 214 recognizes the processing request as a processing request awaiting a relay, the processing request is automatically relayed to the processor 204.

Then, a delay message indicating that the relay is being delayed is generated and transmitted to the user terminal 202 (step S1531). The method of generating a delay message in this case is the same as the method as shown in FIG. 14. The user terminal 202 displays the received delay message on the screen of the display 1202 (step S1515).

By referring to FIGS. 16 to 19, the operating method and configuration of the delay storage system in the Internet are described below.

Figure 16:
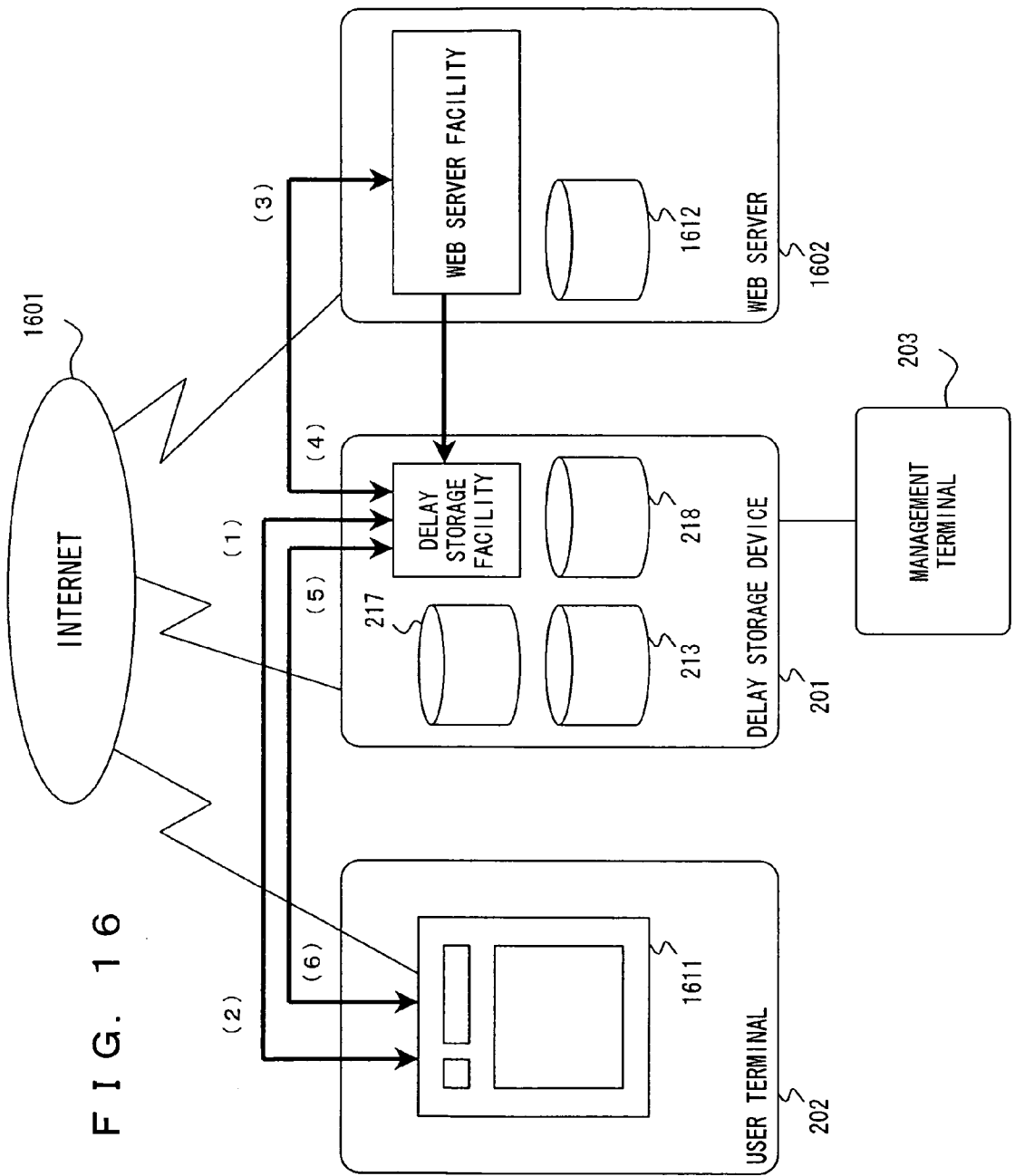
FIG. 16 shows the first operating method.

FIG. 16 shows the configuration of relaying a processing request from a user to a Web server by providing the delay storage device as a kind of appliance server in a stage preceding the Web server. The delay storage device 201, the user terminal 202, and a Web server 1602 shown in FIG. 16 are configured by an independent computer, and connected to the Internet 1601. Among them, the Web server 1602 corresponds to the processor 204 shown in FIG. 2. the user terminal 202 includes a Web browser 1611, and the Web server 1602 includes a disk device storing a Web contents 1612.

For example, when the performance of the Web server 1602 can process 10,000 processing requests per minute, the administrator performs designation such that the relay frequency of processing requests from the management terminal 203 connected to the delay storage device 201 cannot exceed 10,000 processes per minute.

For example, in accepting the sales reservation of new products or accepting the reservation for tickets of a sport match, etc. a large number of requests for reservations concentrate at the start of the acceptance and the 1602 cannot successfully treat the processes and the process is delayed, in such cases the above-mentioned operating method is effective.

The processes performed by the delay storage device 201 itself are only receiving a processing request from the user terminal 202, storing it, and returning a message that the process is in delay to the user terminal 202. Therefore, as compared with the actual reserving process performed by the Web server 1602, the load of the computing system is smaller. Therefore, as compared with the Web server 1602, it is expected to treat much more processing requests per unit time. The procedure shown in FIG. 16 is described below.

(1) The delay storage device 201 receives a processing request from the user terminal 202.
(2) A delay message (for example, delay messages shown in FIGS. 4, 5, and 6) indicating that the process is being delayed is transmitted to the user terminal 202.
(3) After the relay time is adjusted such that the specified number of processing requests per unit time cannot be exceeded, the accepted processing requests are relayed to the Web server 1602.
(4) The Web server 1602 sequentially process the relayed processing request, and the result is returned to the delay storage device 201. The delay storage device 201 stores the returned processing result in the processing result file 218.
(5) The user terminal 202 requests the delay storage device 201 for transmitting a processing result using the identifier of the processing request.
(6) The delay storage device 201 returns a processing result to the user terminal 202.

Normally, when a user is kept waiting without an answer to the processing request, the user tends to stop the process and transmits a processing request again. Therefore, in the configuration without the delay storage device 201, the load of the Web server 1602 becomes higher than the load of the actual processing request by the suspend-request repetitive processing requests. Furthermore, when a user transmits a request again without knowing the status of his or her preceding request for reservation, multiple processes are requested.

On the other hand, when the delay storage device 201 are arranged between the user terminal 202 and the Web server 1602, and the message that a processing request has been accepted is quickly returned to the user, the above-mentioned problem can be solved.

Figure 17:
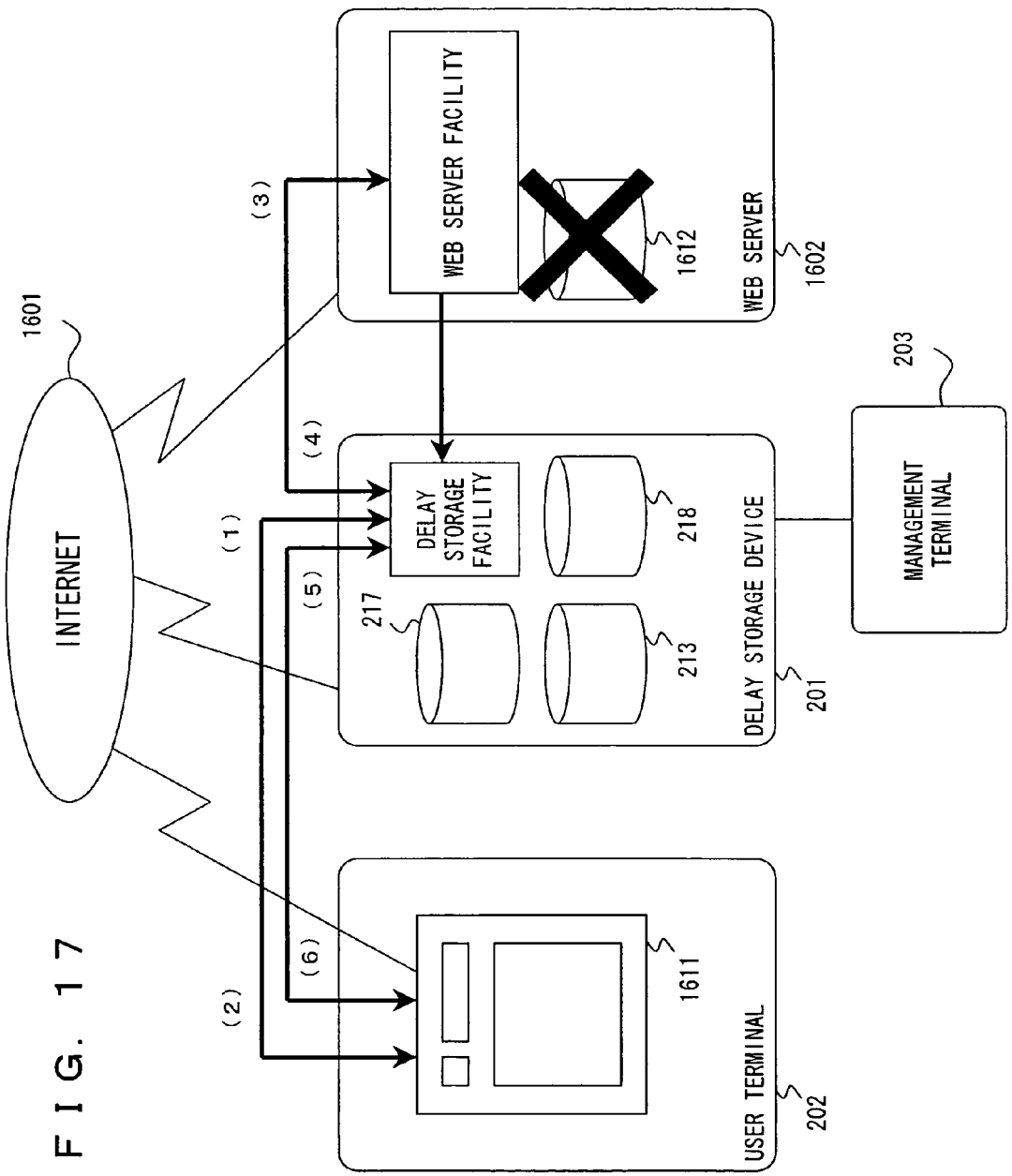
FIG. 17 shows the second operating method.

FIG. 17 shows the operating method in which the disk device of the Web server 1602 becomes in fault in the similar configuration shown in FIG. 16, the device in fault is replaced and the operation of the Web server 1602 stops for one hour for the replacing process.

In this example, the administrator instructs to delay the relay of a processing request by one hour through the management terminal 203, and a processing request received from the user terminal 202 is temporarily stored in the delay storage device 201. The processes (1) and (4) through (6) shown in FIG. 17 are similar to those shown in FIG. 16. The processes in (2) and (3) are described as follows.
(2) A delay message (for example, the delay message as shown in FIG. 7) that a process is being delayed is returned to the user terminal 202.
(3) After a specified delay time passes, an accepted processing request is relayed to the Web server 1602.

With the configuration without the delay storage device 201 in FIG. 17, although the user transmits a processing request, no answer is returned or the transmitted processing request is not processed even after the process is resumed. Therefore, it is necessary to issue a request again when the process is resumed.

On the other hand, by placing the delay storage device 201 between the user terminal 202 and the Web server 1602, it is possible to inform the user about the cause of the delay of the processing request and the predicted time at which a result could be obtained. Furthermore, since the processing request of the user is stored in the delay storage device 201, the processing request can be sequentially processed after the resumption of the process of the Web server 1602.

The arranging method of the delay storage device 201 and the Web server 1602 can be a method of arranging them on the same computer or arranging them in different computers.

Figure 18:
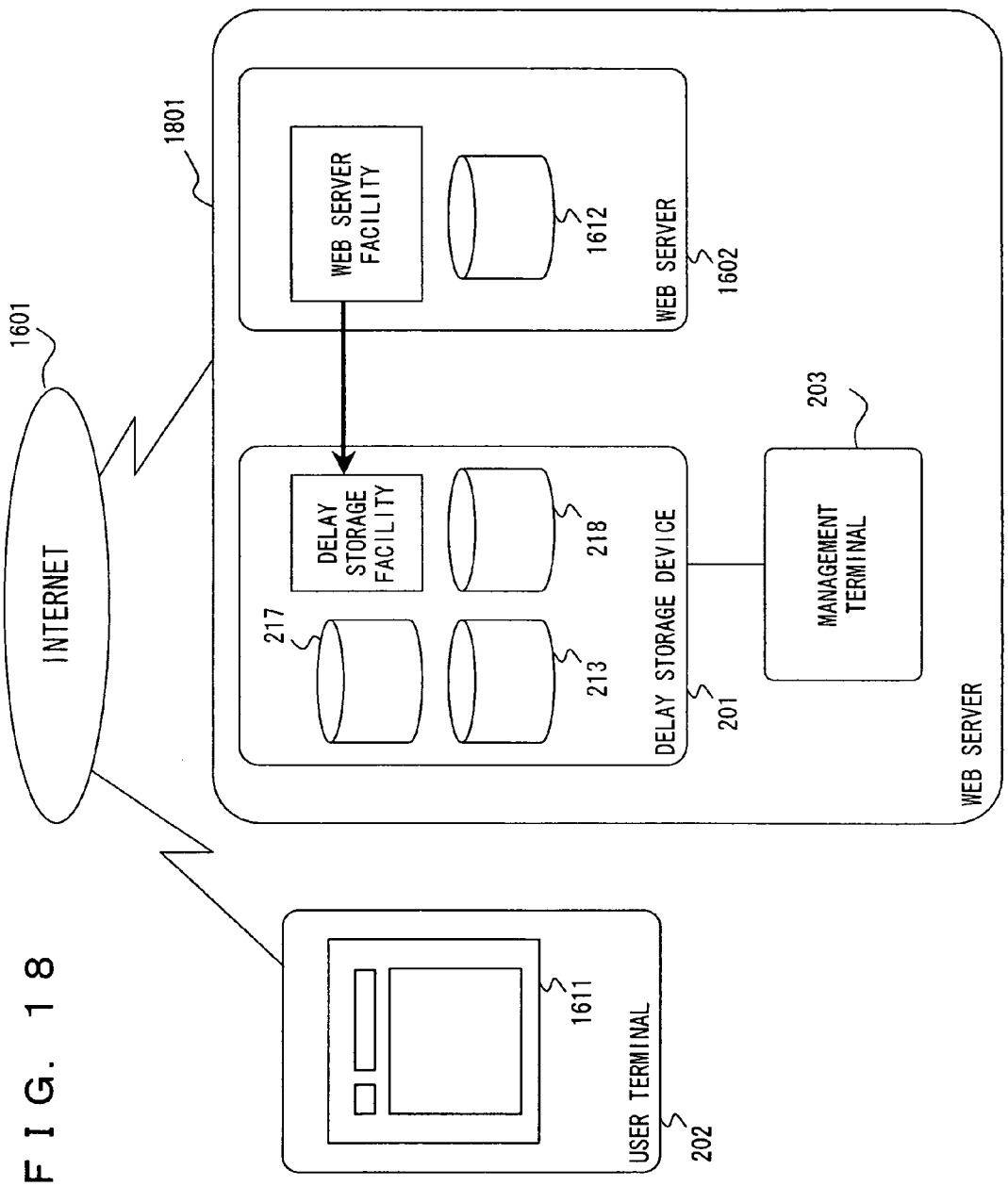
FIG. 18 shows the first delay storage system.

FIG. 18 shows the configuration in the former method. With the configuration, the functions of the delay storage device 201, the management terminal 203, and the Web server 1602 are realized by the same computer, and the computer is connected to the Internet 1601 as a Web server 1801 with a delayed relay facility.

In this case, since the user sees the delay storage device 201 and the Web server 1602 as one structure, the acceptance and relay facilities can be taken over by the delay storage device 201 only by transmitting the same processing request to it as the processing request transmitted to the conventional Web server.

Figure 19:
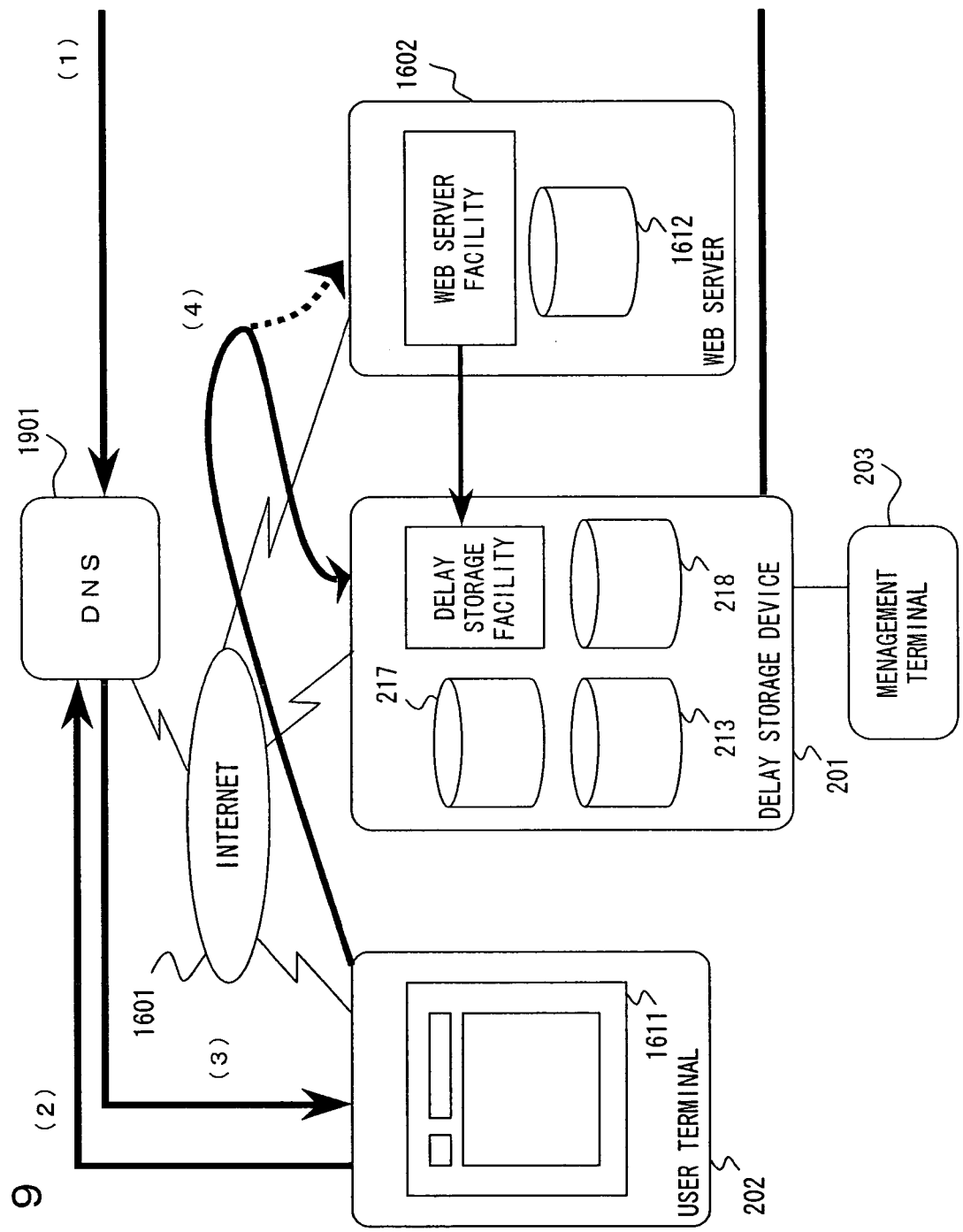
FIG. 19 shows the second delay storage system.

FIG. 19 shows the configuration in the latter arranging method. The configuration is effective when the Web server 1602 is in the operating state, the delay storage device 201 is arranged in the computers independent of the Web server 1602, and a processing request issued from a user to the Web server 1602 is relayed through the delay storage device 201.

In the communication service using the Internet 1601, a processing request from the user terminal 202 to the Web server 1602 is transmitted to the Web server 1602 by replacing the name of the 1602 with the address in the network through the name solving system called DNS.

When a processing request is relayed to the Web server 1602 through the delay storage device 201, the entry of the Web server 1602 managed in a DNS 1901 is replaced with that of the delay storage device 201, thereby switching the address of the Web server 1602 viewed from the user terminal 202. In this method, a processing request from the user terminal 202 to the Web server 1602 can be relayed to the Web server 1602 through the delay storage device 201. The procedure in FIG. 19 is shown below.
(1) The administrator registers the address of the delay storage device 201 in the DNS 1901 by the name of the Web server 1602.
(2) The user terminal 202 inquires of the 1901 about the address of the Web server 1602.
(3) The 1901 answers the user terminal 202 the address of the delay storage device 201.
(4) The user terminal 202 accesses the delay storage device 201 using the returned address and the name of the Web server 1602 as the access destination.

The delay storage device 201, the user terminal 202, the management terminal 203, and the processor 204 shown in FIG. 2 can be configured using the information processing device (computer) as shown in FIG. 20. The information processing device shown in FIG. 20 comprises a CPU (central processing unit) 2001, memory 2002, an input device 2003, an output device 2004, an external storage device 2005, a medium drive device 2006, and a network connection device 2007, and they are interconnected via a bus 2008.

The memory 2002 includes, for example, ROM (read only memory), RAM (random access memory), etc., and stores a program and data. The CPU 2001 performs necessary process by executing a program using the memory 2002.

The processing request accepting section 211, the processing request storage section 212, the relay time adjustment section 214, the processing result accepting section 215, and the processing result storage section 216 correspond to the programs stored in the memory 2002.

The input device 2003 can be, for example, a keyboard, a pointing device, a touch panel, etc. and is used in inputting an instruction and information from an operator (user and administrator). The output device 2004 can be, for example, a display, a printer, a speaker, etc. and is used in outputting an inquiry to an operator or a processing result. The input devices 1201 and 1203 shown in FIG. 12 correspond to the input device 2003, and the display 1202 shown in FIG. 12 corresponds to the output device 2004.

The external storage device 2005 can be, for example, a magnetic disk device, an optical disk device, a magneto-optical disk device, a tape device, etc. The information processor stores the program and data in the external storage device 2005 and uses them as necessary by loading them into the memory 2002.

The external storage device 2005 is also used to store the information management table 213, the processing request file 217, the processing result file 218, and the storage file 221 shown in FIG. 2.

The medium drive device 2006 drives the portable record medium 2009, and accesses the recorded contents. The portable record medium 2009 is an arbitrary computer-readable record medium such as a memory card, a flexible disk, CD-ROM (compact disk read only memory), optical disk, magneto-optical disk, etc. The operator stores the program and data in the portable record medium 2009, and uses them as necessary after loading into the memory 2002.

The network connection device 2007 is connected to any communication network such as LAN (local area network), the Internet, etc., and performs data conversion for the communications. The information processing device receives the program and data from an external device through the network connection device 2007 as necessary, and uses them after loading into the memory 2002.

Figure 21:
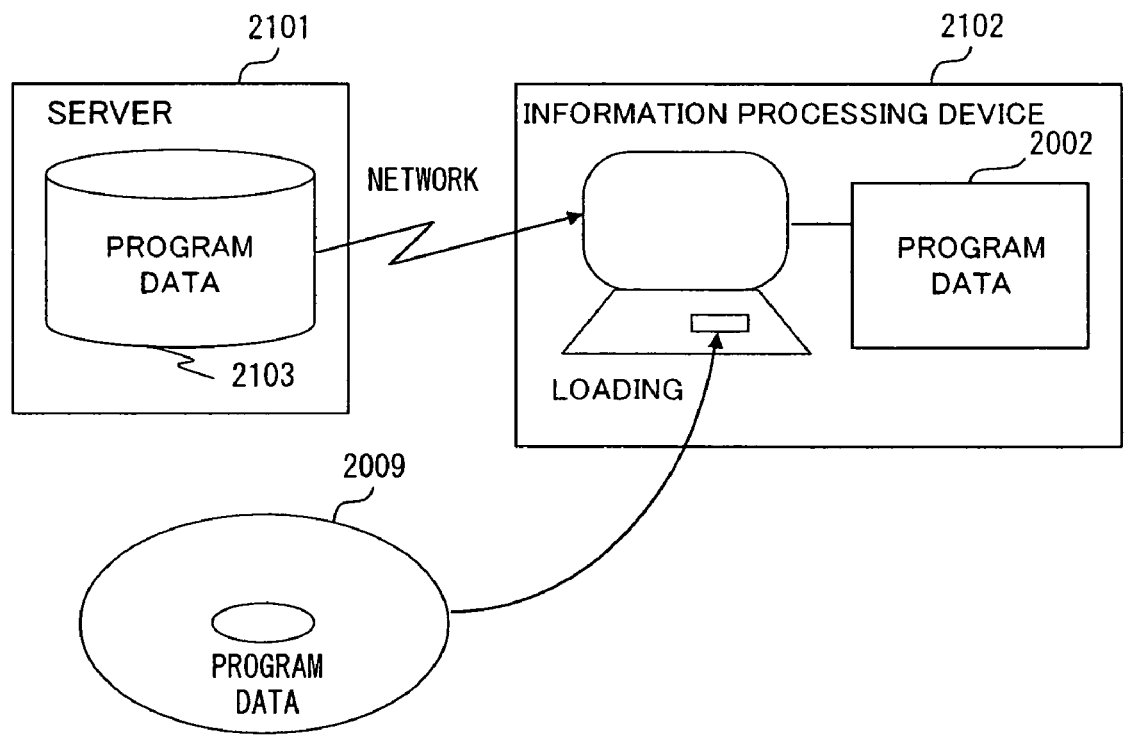
FIG. 21 shows a record medium.

FIG. 21 shows a computer-readable record medium capable of providing a program and data for the information processing device shown in FIG. 20. A program and data stored in the portable record medium 2009 and a database 2103 of a server 2101 are loaded into the memory 2002 of the information processing device 2102. The server 2101 generates a carrier signal for transmitting the program and data, and transmits it to the information processing device 2102 through any transmission medium on the network. The CPU 2001 executes a program using the data, and performs a necessary process.

According to the present invention, when processing requests concentrate on the processor at a subsequent stage of a Web server, etc. and there occurs a delay of processes due to a heavy load, the overflow of the processor can be avoided by relaying a processing request to the processor while adjusting the transfer rate of processing requests. For a user, although the load of the processor at a subsequent stage becomes heavy, the user is not kept waiting without an answer about the processing request, and can later receive a processing result.

What is claimed is:

1. A delay storage device to accept a processing request from a requester to a processor, and to relay the processing request to the processor, the delay storage device comprising:
   a processing unit including an accepting section, the accepting section to accent the processing request and a relay section;
   a first physical storage to temporarily store the accepted processing request;
   a second physical storage to store an acceptance time of the accepted processing request, wherein the relay section to relay processing requests to the processor in order of the acceptance time while adjusting a transfer rate of the accepted processing request depending on performance of the processor; and
   a third physical storage to store a processing result returned from the processor in response to the processing request relayed to the processor, wherein
   the relay section to receive a specified delay time, and to relay the accepted processing request to the processor after a passage of the specified delay time from the acceptance time of the accepted processing request, and
   the accepting sections,
      to issue an identifier for unique identification of the accepted processing request,
      when a relay of the accepted processing request is delayed, to generate a delay message predetermined depending on a reason for a delay of the relay, and to return the identifier and the delay message to the requester as an answer for the accepted processing request, and,
      when the requester requests a processing result for the accepted processing request using the identifier, to read a corresponding processing result from the third physical storage and to transmit the processing result to the requester.

2. The device according to claim 1, wherein
the relay section to receive a number of processing requests per specified unit time, and to adjust a transfer rate of the accepted processing request such that a number of processing requests per unit time transmitted to the processor cannot exceed a specified number of processing requests per unit time.

3. The device according to claim 1, wherein
upon receipt of an instruction to stop a relay, the relay section to stop the relay of the accepted processing request until an instruction to resume a relay is next received.

4. The device according to claim 1, wherein
the relay section to detect a load status of the processor, and adjusts a transfer rate of the processing request based on the detected load status.

5. A record medium storing a program used to direct a computer to receive a processing request from a requester to a processor and relay the processing request to the processor, the program directing the computer to perform:
   accepting the processing request;
   temporarily storing the accepted processing request;
   storing an acceptance time of the accepted processing request;
   relaying processing requests to the processor in order of the acceptance time while adjusting a transfer rate of the accepted processing request depending on performance of the processor; and
   storing in a result storage a processing result returned from the processor in response to the processing request relayed to the processor, wherein
   the relaying receives a specified delay time, and relays the accepted processing request to the processor after a passage of the specified delay time from the acceptance time of the accepted processing request, and
   the accepting,
      issues an identifier for unique identification of the accepted processing request,
      when a relay of the accepted processing request is delayed, generates a delay message predetermined depending on a reason for a delay of the relay, and returns the identifier and the delay message to the requester as an answer for the accepted processing request, and,
      when the requester requests a processing result for the accepted processing request using the identifier, reads a corresponding processing result from the result storage and transmits the processing result to the requester.

6. A delay treating method for accepting a processing request from a requester to a processor, and relaying the processing request to the processor, comprising:

a delay storage device to accept the processing request;

the delay storage device to temporarily store the accepted processing request;

the delay storage device to store an acceptance time of the accepted processing request;

the delay storage device to relay processing requests to the processor in order of the acceptance time while adjusting a transfer rate of the accepted processing request depending on performance of the processor;

the processor to execute a process of a relayed processing request and to return a processing result; and the delay storage device to store in a result storage the processing result returned from the processor in response to the processing request relayed to the processor, wherein the relaying to receive a specified delay time, and to relay the accepted processing request to the processor after a passage of the specified delay time from the acceptance time of the accepted processing request, and the accepting, to issue an identifier for unique identification of the accepted processing request, when a relay of the accepted processing request is delayed, to generate a delay message predetermined depending on a reason for a delay of the relay, and to return the identifier and the delay message to the requester as an answer for the accepted processing request, and, when the requester requests a processing result for the accepted processing request using the identifier, to read a corresponding processing result from the result storage and to transmit the processing result to the requester.

* * * * *